US012610246B2

(12) United States Patent
Rofougaran et al.

(10) Patent No.: US 12,610,246 B2
(45) Date of Patent: Apr. 21, 2026

(54) VIRTUAL FIBER COMMUNICATION SYSTEM AND METHOD FOR SPECTRUM AVAILABILITY-BASED CONTROL OF WIRELESS BACKHAUL MESH NETWORK

(71) Applicant: Peltbeam Inc., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Puya Rofougaran, Irvine, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/344,656

(22) Filed: Sep. 30, 2025

(65) Prior Publication Data

US 2026/0052397 A1     Feb. 19, 2026

Related U.S. Application Data

(63) Continuation of application No. 19/201,997, filed on May 8, 2025, now Pat. No. 12,452,685, which is a
(Continued)

(51) Int. Cl.
*H04W 16/14* (2009.01)
*H04W 84/18* (2009.01)

(52) U.S. Cl.
CPC ............ *H04W 16/14* (2013.01); *H04W 84/18* (2013.01)

(58) Field of Classification Search
CPC ............................. H04W 16/14; H04W 84/18
(Continued)

(56) References Cited

U.S. PATENT DOCUMENTS

| | | |
|---|---|---|
| 2002/0045459 A1 | 4/2002 | Morikawa |
| 2002/0176396 A1 | 11/2002 | Hammel et al. |

(Continued)

OTHER PUBLICATIONS

Notice of Allowance for U.S. Appl. No. 18/807,998, dated Oct. 23, 2024.
(Continued)

*Primary Examiner* — Mark G. Pannell
(74) *Attorney, Agent, or Firm* — CHIP LAW GROUP

(57) ABSTRACT

A virtual fiber communication system includes a central cloud server that obtains telemetry information from a plurality of network nodes of a wireless backhaul mesh network. The telemetry information includes a first type of telemetry information from a plurality of hybrid analog-digital repeater devices and a second type of telemetry information from a plurality of wireless access point devices. The central cloud server collects data related to properties of signal blockers in a surrounding area of the plurality of network nodes and trains a neural network model based on the first type of telemetry information and the second type of telemetry information. The central cloud server deploys the trained neural network model to detect a Radio Frequency (RF) signal interference or blockage caused by the signal blockers. The detection is based on the data related to the properties of the signal blockers.

20 Claims, 12 Drawing Sheets

Related U.S. Application Data continuation of application No. 19/001,631, filed on Dec. 26, 2024, now Pat. No. 12,335,745, which is a continuation of application No. 18/807,998, filed on Aug. 18, 2024, now Pat. No. 12,238,531.

(58) Field of Classification Search

USPC ........................................................ 370/329

See application file for complete search history.

(56) References Cited

U.S. PATENT DOCUMENTS

| | | |
|---|---|---|
| 2004/0095907 A1 | 5/2004 | Agee et al. |
| 2005/0030968 A1 | 2/2005 | Rich et al. |
| 2007/0286213 A1 | 12/2007 | Fodor et al. |
| 2010/0195503 A1 | 8/2010 | Raleigh |
| 2014/0269257 A1 | 9/2014 | Mandiganal et al. |
| 2015/0201348 A1 | 7/2015 | Gupta et al. |
| 2015/0304852 A1 | 10/2015 | El-Refaey et al. |
| 2015/0326461 A1 | 11/2015 | Singh et al. |
| 2016/0021597 A1 | 1/2016 | Hart et al. |
| 2017/0099115 A1* | 4/2017 | Miller, II .............. H04W 24/08 |
| 2017/0366956 A1 | 12/2017 | Yoshida et al. |
| 2018/0317093 A1 | 11/2018 | Li et al. |
| 2020/0288332 A1 | 9/2020 | Annambhotla |
| 2021/0136603 A1* | 5/2021 | Kottkamp ................ G06N 3/08 |
| 2022/0167183 A1* | 5/2022 | Eng .......................... G06N 3/09 |
| 2022/0321192 A1* | 10/2022 | Katla ................... H04B 7/0696 |
| 2022/0394498 A1* | 12/2022 | Hatamian ............. H04W 4/021 |
| 2023/0156826 A1 | 5/2023 | Palermo et al. |
| 2023/0361855 A1 | 11/2023 | Hatamian et al. |
| 2023/0361897 A1* | 11/2023 | Rácz .................... H04B 17/373 |
| 2024/0214046 A1* | 6/2024 | Zirwas .................. H04W 24/10 |
| 2024/0334462 A1* | 10/2024 | Chen ..................... H04W 72/51 |
| 2025/0254536 A1* | 8/2025 | Amuru .................. H04W 24/02 |
| 2025/0260466 A1* | 8/2025 | Li ........................... H04L 41/16 |

OTHER PUBLICATIONS

Notice of Allowance for U.S. Appl. No. 19/001,631, dated Feb. 18, 2025.

Notice of Allowance for U.S. Appl. No. 19/201,997, dated Jun. 26, 2025.

* cited by examiner

300

First Master WAP Device 112A

CONTROL SECTION
302

Processor 306

Memory 308

Telemetry Information
308A

Frequency Converter
310

RF FRONT-END SECTION
304

Wireless
Chipset
312

Plurality of
WLAN
Antennas
314

Phase Array
Antenna
316

Network
Port
318A

Network
Port
318B

Network
Port
318C

Network
Port
318D

Power
Supply
320

500

/600

Obtain telemetry information from a plurality of network nodes of a wireless backhaul mesh network 602

Establish dual radio access networks in an analog data plane among the plurality of network nodes in the wireless backhaul mesh network in which a first radio access network of the dual radio access networks is established using a first frequency spectrum and a second radio access network is established using a second frequency spectrum lower than the first frequency spectrum 604

Control the first radio access network and the second radio access network in the analog data plane via a common control plane which is distinct from the analog data plane 606

Cause each hybrid analog-digital repeater device of a plurality of hybrid analog-digital repeater devices to form dual analog data links on a first type of polarization and a second type of polarization with one or more neighboring hybrid analog-digital repeater devices in the wireless backhaul mesh network, wherein the dual analog data links corresponds to two concurrent point-to-point wireless backhaul links among the plurality of hybrid analog-digital repeater devices, and wherein the plurality of hybrid analog-digital repeater devices are part of the plurality of network nodes 608

Cause a first master WAP device of the plurality of master WAP devices to receive a first data stream associated with a first network service provider over a first virtual local area network (VLAN) from an aggregation switch and a second master WAP device of the plurality of master WAP device to receive a second data stream associated with a second network service provider over a second VLAN from the aggregation switch coupled to a core fiber backhaul link to control traffic flow and routing among the core fiber backhaul link and the plurality of master WAP devices in the isolated network slice 610

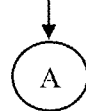

FIG. 6A

(A)

Cause a first analog-digital repeater device of the plurality of hybrid analog-digital repeater devices to receive the first data stream in a first intermediate frequency from the first master WAP device and the second data stream in a second intermediate frequency from the second master WAP device, wherein the plurality of hybrid analog-digital repeater devices are part of the plurality of network nodes 612

Cause the first analog-digital repeater device of the plurality of hybrid analog-digital repeater devices to relay the first data stream and the second data stream over the plurality of hybrid analog-digital repeater devices via the point-to-point wireless backhaul links to reach to one or more service WAP devices 614

Cause one or more service WAP devices of the plurality of network nodes to selectively communicate the first data stream and the second data stream over wireless local area network (WLAN) signals with a plurality of user equipment (UEs) in a data throughput greater than a threshold throughput, based on an association of a UE of the plurality of UEs to a given network service provider of the plurality of different network service providers 616

Cause each of the plurality of hybrid analog-digital repeater devices to extract time division duplex (TDD) timing parameters from wireless local area network (WLAN) beacon signals to align propagation slots of the each of the plurality of hybrid analog-digital repeater devices to receive mmWave signals from an upstream neighboring node in a receive phase (Rx) and transmit to a downstream neighboring node in a transmit phase (Tx) 618

Cause each of the plurality of hybrid analog-digital repeater devices to synchronize to phases of wireless local area network (WLAN) time division duplexing (TDD) slots at each hop of the plurality of hybrid analog-digital repeater devices for zero-buffer mmWave signals relay across the plurality of network nodes without baseband processing, based on the extracted TDD timing parameters 620

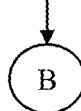

B

Obtain frequency spectrum availability metadata and custom-defined access parameters from one or more spectrum owner nodes 622

Detect spectrum availability variations across the plurality of network nodes based on the obtained telemetry information, the frequency spectrum availability metadata, and the custom-defined access parameters 624

Obtain a capacity increase request from a plurality of user equipment (UEs) to increase capacity for a specific time-period 626

Based on the detected spectrum availability variations across the plurality of network nodes, control the plurality of network nodes to inject additional capacity to one or more data sessions in the wireless backhaul mesh network in a real-time or near real time when an increase in data traffic demand is detected in one or more data propagation paths across the plurality of network nodes in the wireless backhaul mesh network 628

Monitor a plurality of flow parameters of data streams associated with a plurality of user equipment (UEs) served by the wireless backhaul mesh network based on the obtained telemetry information and the detected spectrum availability variations across the plurality of network nodes, and wherein the plurality of flow parameters comprise two or more of a bandwidth demand, a latency sensitivity, and a jitter tolerance 630

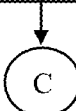

Determine a set of alternative analog data propagation paths either over the first radio access network corresponding to a mmWave mesh network or over the second radio access network corresponding to a wireless local area network (WLAN) network to serve the plurality of user equipment (UEs), based on the monitored plurality of flow parameters of data streams associated with the plurality of UEs 632

Prioritize data packets over the plurality of network nodes based on a type-of-service requested by a user equipment (UE) of a plurality of UEs served by the wireless backhaul mesh network, and the custom-defined access parameters from one or more spectrum owner nodes 634

Cause each of the plurality of network nodes to detect a local interference and congestion event based on the obtained telemetry information
636

Cause each of the plurality of network nodes to calibrate radio frequency (RF) parameters including a transmit power, a transmit frequency, or a beam orientation based on the detected local interference and congestion event.
638

FIG. 6D

VIRTUAL FIBER COMMUNICATION SYSTEM AND METHOD FOR SPECTRUM AVAILABILITY-BASED CONTROL OF WIRELESS BACKHAUL MESH NETWORK

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/201,997, filed on May 8, 2025, which is a Continuation Application of U.S. Pat. No. 12,335,745, issued on Jun. 17, 2025, which is a Continuation Application of U.S. Pat. No. 12,238,531 issued on Feb. 25, 2025. The above-referenced application is hereby incorporated herein by reference in its entirety.

FIELD OF TECHNOLOGY

Certain embodiments of the disclosure relate to wireless backhaul communication and virtual fiber systems. More specifically, certain embodiments of the disclosure relate to a virtual fiber communication system (e.g., an advanced wireless backhaul communication system) and method for spectrum availability-based control of wireless backhaul mesh network for high-performance, ultra-reliable, and ultra-low latency communication.

BACKGROUND

The emergence of new bandwidth-hungry applications like ultra-high-definition video streaming, virtual reality, autonomous mobility, and industrial automation is driving demand for wireless connectivity solutions that can cost-effectively deliver multi-gigabit capacities with smooth user experiences. However, existing wireless and fiber infrastructure have struggled to fulfil modern demands globally due to a variety of constraints related to inconsistent performance, complex rollouts, and adaptability limitations in dense environments. Legacy mmWave networks rely on expensive fiber backhauling to transport signals preventing flexible deployments. Further, installing new fiber-optic connections on existing utility poles often necessitates the excavation of sidewalks and streets, a process that can be prohibitively costly. Moreover, the deployment of new fiber networks can cause significant inconvenience to both residents and businesses. Furthermore, conventional Wi-Fi mesh topologies face bottlenecks around shared channel contention, interference, and limited relay node resilience.

Further, the rapid growth of wireless communication technologies and the increasing demand for high-bandwidth applications have led to significant challenges in the current spectrum management landscape. The existing licensed spectrum assets are often allocated as static, perpetual assignments, resulting in severe underutilization of valuable spectrum resources. This underutilization persists even amidst growing capacity shortages, as the static allocation fails to adapt to dynamic, location-specific demands. Emerging applications, such as the metaverse and cloud robotics, are driving an unprecedented surge in bandwidth requirements. This rapid growth is further exacerbating the supply-demand mismatch, as the current static spectrum allocation struggles to keep pace with the evolving needs of these innovative applications. The legacy wireless systems also face inconsistencies around throughput, resilience, and complexity. This necessitates carrier-grade wireless connectivity to deliver fiber-like consistency combined with agile, scalable deployment models. Furthermore, latency and signal noise are other technical problems with existing wireless communication systems and network architecture. Such latency increases when more wireless access points or relay nodes are introduced to extend the communication range.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A virtual fiber communication system and method for spectrum availability-based control of wireless backhaul mesh network for high-performance, ultra-reliable, and ultra-low latency communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 6A, 6B, 6C, and 6D collectively, is a flowchart of a method for spectrum availability-based control of wireless backhaul mesh network for high-performance, ultra-reliable, and ultra-low latency communication, in accordance with an embodiment of the disclosure.

DETAILED DESCRIPTION OF THE DISCLOSURE

Figure 1A:
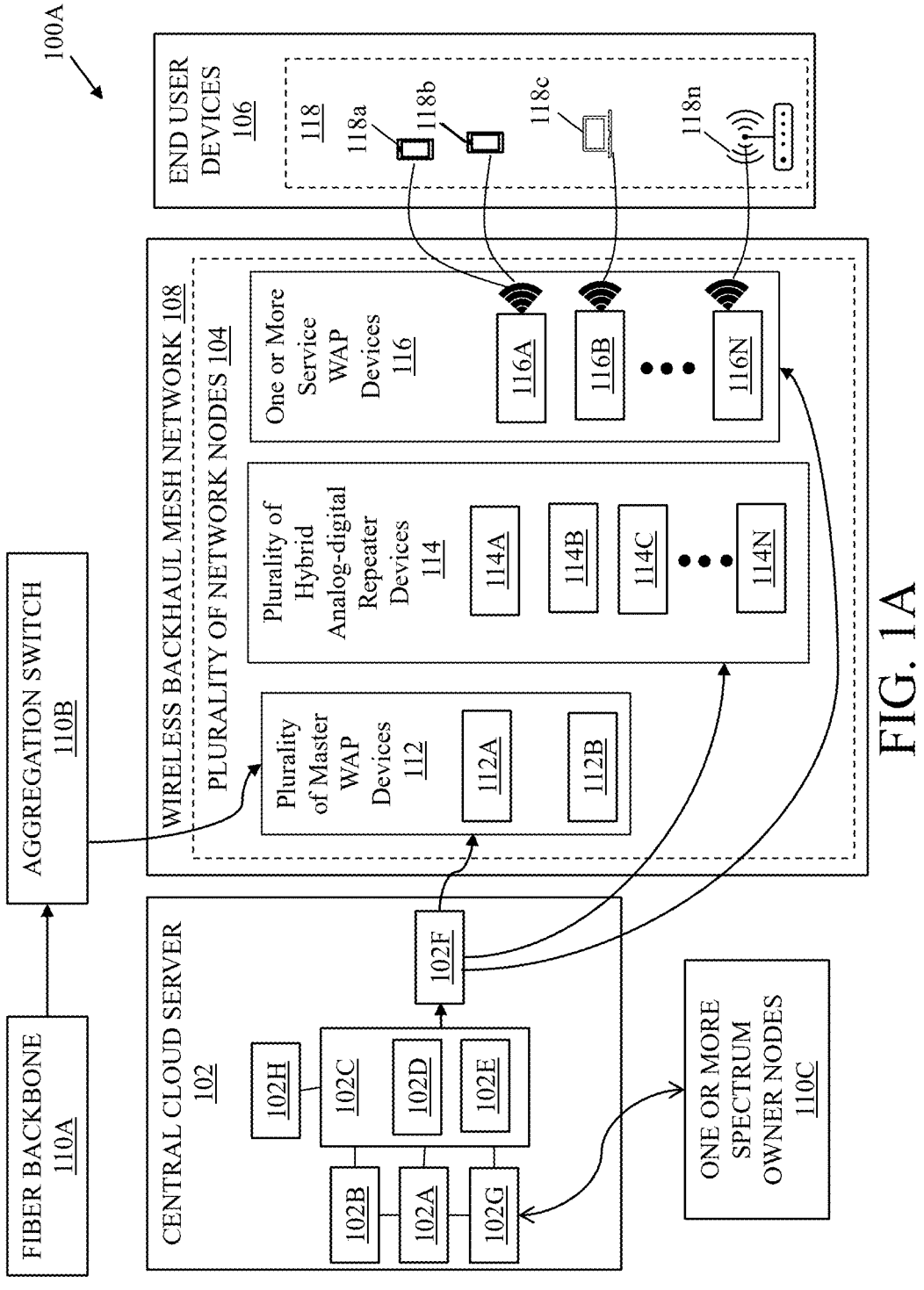
FIG. 1A is a diagram that illustrates an exemplary virtual fiber communication system for spectrum availability-based control of wireless backhaul mesh network for high-performance, ultra-reliable, and ultra-low latency communication, in accordance with an exemplary embodiment of the disclosure.

Certain embodiments of the disclosure may be found in a virtual fiber communication system and method for spectrum availability-based control of wireless backhaul mesh network for high-performance, ultra-reliable, and ultra-low latency communication.

The virtual fiber technology is an emerging technology and currently faces many technical challenges in practical implementation. For example, how to handle backhaul network with consistent increase in the number of connected devices and data traffic demand is still an issue. Limited bandwidth in the backhaul network may result in slower data speeds, higher latency, and degraded quality of service for end-users. The rapid growth of wireless communication technologies and the increasing demand for high-bandwidth applications have led to significant challenges in the current spectrum management landscape.

Unlike conventional systems, the virtual fiber communication system of the present disclosure may control a plurality of network nodes to inject additional capacity to one or more ongoing data sessions in the wireless backhaul mesh network in a real-time or near real time when an increase in data traffic demand is detected in one or more data propagation paths across the plurality of network nodes in the wireless backhaul mesh network. Advantageously, such control is based on spectrum availability variations across the plurality of network nodes detected by a centralized controller, such as a central cloud server, of the virtual fiber communication system. The approach of detecting spectrum availability variations across multiple network nodes significantly enhances the efficiency and effectiveness of additional capacity injection compared to single-node spectrum analysis. By analyzing spectrum data from multiple nodes, especially the variations in the spectrum availability, the central cloud server gains a comprehensive view of the overall spectrum utilization, enabling it to construct a more accurate and detailed spectrum occupancy map. This distributed approach allows for improved spatial granularity, identifying localized opportunities for capacity injection that might be missed by a single-node analysis. Furthermore, it enhances interference mitigation by considering spectrum occupancy data from neighboring nodes, ensuring that the injected additional capacity does not adversely impact the performance of existing data sessions. Furthermore, the virtual fiber communication system may adapt more quickly to dynamic changes in the radio frequency environment as compared to conventional systems, enabling the central cloud server to make swift decisions about capacity injection. By distributing the spectrum sensing and analysis tasks across multiple network nodes, the system reduces the processing burden on any single node, enhances overall scalability, and improves resilience, ensuring that the network can continue to operate efficiently even in the presence of node failures or network disruptions. This advanced spectrum management approach enables the system to deliver a seamless and high-quality user experience, even in the face of dynamic and challenging radio frequency environments.

Furthermore, in contrast to the conventional communication systems, the virtual fiber communication system and method of the present disclosure provides and is supported by a unique network architecture including a plurality of master Wireless Access Point (WAP) devices, a plurality of hybrid analog-digital repeater devices, and one or more service WAP devices serving end-user devices as part of the plurality of network nodes. The plurality of hybrid analog-digital repeater devices may act as a radio frequency (RF) bridge carrying data traffic to and from the plurality of master Wireless Access Point (WAP) devices to the one or more service WAP devices and vice-versa, where the one or more service WAP devices serves the end-user devices. The system employs a plurality of hybrid analog-digital repeater devices interconnected in a mesh topology via point-to-point wireless backhaul links as virtual fiber, combining the benefits of analog signal propagation with the flexibility of digital systems. Each of hybrid analog-digital repeater device may be primarily analog repeater devices where the data propagation path in the virtual fiber communication system is analog with some digital processing may be performed for external network control, for example, by the central cloud server, and thus may be referred to as hybrid analog-digital repeater device.

In the following description, reference is made to the accompanying drawings, which form a part hereof, and in which are shown, by way of illustration, various embodiments of the present disclosure.

FIG. 1A is a diagram that illustrates an exemplary virtual fiber communication system for spectrum availability-based control of wireless backhaul mesh network for high-performance, ultra-reliable, and ultra-low latency communication, in accordance with an exemplary embodiment of the disclosure. With reference to FIG. 1A, there is shown a virtual fiber communication system 100A. The virtual fiber communication system 100A may include a central cloud server 102, a plurality of network nodes 104, and end-user devices 106. The plurality of network nodes 104 may be connected with each other in a wireless backhaul mesh network 108. There is further shown a fiber backbone 110A and an aggregation switch 110B communicatively coupled to the wireless backhaul mesh network 108 through a plurality of master Wireless Access Point (WAP) devices 112. There is further shown one or more spectrum owner nodes 110C. The central cloud server 102 may include one or more processors (such as a processor 102A and an adaptive spectrum sharing processor (ASSP) 102G), a neural network model 102B, telemetry information 102C (which may include a first type of telemetry information 102D and a second type of telemetry information 102E) and wireless backhaul mesh network parameters 102F. The plurality of network nodes 104 may include the plurality of master WAP devices 112 (e.g. a first master WAP device 112A and a second master WAP device 112B), a plurality of hybrid analog-digital repeater devices 114 (e.g., a first hybrid analog-digital repeater device 114A, a second hybrid analog-digital repeater device 114B, a third hybrid analog-digital repeater device 114C, up to an nth hybrid analog-digital repeater device 114N) and one or more service WAP devices 116 (e.g., service WAP devices 116A, 116B, ... , 116N). There is further shown a plurality of user equipment (UEs) 118 (e.g., UEs 118a, 118b, 118c, ... , 118n) as a part of the end-user devices 106.

The central cloud server 102 includes suitable logic, circuitry, and interfaces that may be configured to communicate with the plurality of network nodes 104 (e.g., the plurality of master WAP devices 112, the plurality of hybrid analog-digital repeater devices 114, and the one or more service WAP devices 116). In an implementation, the central cloud server 102 may be communicatively coupled to each network node including the end-user devices 106. In an example, the central cloud server 102 may be a remote management server that is managed by a third party different from the service providers associated with the plurality of different wireless carrier networks (WCNs), service providers or spectrum owners. In another example, the central cloud server 102 may be a remote management server or a data center that is managed by a third party, or jointly managed, or managed in coordination and association with one or more of the plurality of different WCNs or different service providers.

The processor 102A may be further configured to cause each network node of the plurality of network nodes 104 to determine location information of a plurality of neighboring nodes around each network node. Each network node may determine its geo-location and the geo-location of the neighboring nodes. In an implementation, each of the plurality of hybrid analog-digital repeater devices 114 may further comprise a position sensor (e.g., a gyroscope) or a location sensor (e.g., a global positioning system (GPS) sensor or other geospatial location sensor). In another implementation, each network node may further include Wi-Fi capability, which may be used, for example, to determine its location coordinates or location coordinates of neighboring nodes (e.g., nearby mesh nodes) by received signal strength indication (RSSI)-based triangulation or WI-FI®-based triangulation process, known in the art. Examples of the processor 102A of the central cloud server 102 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The neural network model 102B of the central cloud server 102 may be periodically (e.g., daily and for different times-of-day) trained on data points (e.g., the telemetry information 102C) uploaded to the central cloud server 102 by each network node, such as the plurality of master WAP devices 112, the plurality of hybrid analog-digital repeater devices 114, and the one or more service WAP devices 116.

The telemetry information 102C may be obtained from the plurality of network nodes 104 of the wireless backhaul mesh network 108. The telemetry information 102C may include the first type of telemetry information 102D obtained from the plurality of hybrid analog-digital repeater devices 114 in the wireless backhaul mesh network 108, and the second type of telemetry information 102E from the plurality of master WAP devices 112 and the one or more service WAP devices 116 in the wireless backhaul mesh network 108. The second type of telemetry information 102E may be different from the first type of telemetry information 102D. The first type of telemetry information 102D may be related to the state of the repeater devices themselves (i.e. performance of the plurality of hybrid analog-digital repeater devices 114), whereas the second type of telemetry information 102E may be related to the performance metrics and characteristics of the end-user devices connected to the WAP devices (the plurality of master WAP devices 112 and the one or more service WAP devices 116 in the network, providing insights into the user experience.

The wireless backhaul mesh network parameters 102F may include telemetry optimization outputs, such as beam steering parameters, phase shifter settings, and other repeater parameters, including transmit power, beamforming direction, and modulation scheme, enabling optimization of individual hybrid analog-digital repeater devices for different deployment scenarios in a real time or near real time. For newly added hybrid analog-digital repeater nodes, the central cloud server 102 may be configured to auto-assign network parameters, security credentials, and configuration based on the node's role and mesh connections using zero-touch provisioning. The virtual fiber communication system 100A may utilize real-time monitoring and data analytics to detect interference from other wireless networks or devices. Upon detecting interference, the virtual fiber communication system 100A may adjust the repeaters' parameters to mitigate its impact. Similarly, the virtual fiber communication system 100A may detect blockages caused by objects such as buildings or trees and adjust the repeaters' parameters to bypass these obstructions. The central cloud server 102 may dynamically adjust antenna parameters, such as beam directions and amplifier gains, to route signals along the optimal paths among the plurality of network nodes 104 in the wireless backhaul mesh network 108.

The adaptive spectrum sharing processor (ASSP) 102G may be configured to control spectrum leasing, enable dynamic and flexible spectrum authorization, and optimize spectrum allocation based on real-time demand. The ASSP 102G may also be referred to as a blockchain controller used to create smart contracts that define the terms of rental agreements between spectrum owners, such as the one or more spectrum owner nodes 110C, and users, such as the end-user devices 106. Such smart contracts may include usage terms, pricing models, settlement mechanisms, authentication protocols, and performance service level agreements (SLAs). The ASSP 102G enables decentralized policy propagation across the plurality of network nodes 104, for example, the configuration updates may be transmitted as blockchain transactions retaining integrity. Each of the plurality of network nodes 104 and the central cloud server 102 may further include a distributed ledger 102H, which may enable a transparent audit trail on propagated routing rules.

The wireless backhaul mesh network 108 may be a resilient, high-capacity wireless network that extends the reach of the fiber backbone 110A to provide widespread coverage to end users, such as the end-user devices 106 via the plurality of network nodes 104.

The fiber backbone 110A may act as a data source in the virtual fiber communication system 100A. The fiber backbone 110A may be a high-performance, fiber-optic core network infrastructure that connects central offices, data centers, and the wireless backhaul mesh network 108. The fiber backbone 110A may include fiber-optic cables connected to the high-capacity aggregation switches, such as the aggregation switch 110B. The fiber backbone 110A may aggregate traffic from the central offices and data centers and connect to the aggregation switch 110B enabling seamless integration between the fiber and wireless network components.

The aggregation switch 110B may be a network switch that operates at both Data Link Layer (DLL) corresponding to layer 2 and Network Layer (NL) corresponding to layer 3 of Open Systems Interconnection (OSI) model. The aggregation switch 110B may be communicatively coupled to a core fiber backhaul link, such as the fiber backbone 110A, to control traffic flow and routing among the core fiber backhaul link, such as the fiber backbone 110A, and the plurality of master WAP devices 112 in the isolated network slice.

The one or more spectrum owner nodes 110C may be configured to communicate with the central cloud server 102. The central cloud server 102 may obtain frequency spectrum availability metadata and custom-defined access parameters from the one or more spectrum owner nodes 110C. The virtual fiber communication system 100A may allow spectrum owners to define customized access rules and data routing logic, via the one or more spectrum owner nodes 110C. The spectrum owners may specify smart contract rules encoding authorization credentials like crypto keys for allowing client devices, such as the end-user devices 106, to use owned bands. The central cloud server 102 may employ environment-aware algorithms to dynamically select network nodes from the plurality of network nodes 104 and beam directions to route authorized user traffic over the owned spectrum based on real-time conditions.

The plurality of master WAP devices 112 includes suitable logic, circuitry, and interfaces that may be configured to provide access to the Internet or wireless backhaul in 5G or 6G networks. Examples of the plurality of master WAP devices 112 may include, but is not limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, or a network security device, or one or more combinations thereof.

The plurality of hybrid analog-digital repeater devices 114 may be disposed as a radio frequency (RF) bridge between the plurality of master WAP devices 112 and the one or more service WAP devices 116 such that a data propagation path of user data relayed through a network of the plurality of hybrid analog-digital repeater devices 114 may be analog without any digital decoding or encoding of the user data in a RF signal to reduce latency less than a threshold time. For example, the data propagation path may comprise high-frequency analog circuitry to minimize latency to nanoseconds. Multi-hop relaying of intermediate frequency signals (e.g. mmWave signals) may happen without any digital encoding or decoding of the user data (i.e., payload). Further, a backchannel connectivity and control of the network of the plurality of hybrid analog-digital repeater devices 114 may be via a lower WLAN frequency (e.g., 2.4 GHz or 5 Ghz of Wi-Fi® 7 or 8), based on a signal metadata of the incoming RF signal. While the data propagation path may remain entirely analog for lowest latency, the plurality of hybrid analog-digital repeater devices 114 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture. The plurality of hybrid analog-digital repeater devices 114 extends the coverage area of the plurality of master WAP devices 112 and one or more service WAP devices 116, allowing them to serve its corresponding UEs in areas that may have poor signal reception.

The one or more service WAP devices 116 may be configured to receive a beam of RF signals in the intermediate frequency band (e.g., mm Wave frequency or intermediate frequency in range of 10-300 GHZ) from the hybrid analog-digital repeater devices and convert back to the WLAN signal to serve the plurality of UEs 118 in a data throughput greater than a threshold throughput. Each of the plurality of master WAP devices 112 and the one or more service WAP devices 116 may be configured to perform Multi-User, Multiple Input, Multiple Output (Mu-MIMO) to corresponding connected UEs via corresponding mmWave New Radio Unlicensed (NR-U) links. The use of intermediate frequencies (e.g., millimeter-wave frequencies) and Mu-MIMO together may provide high data rates and efficient use of the available spectrum.

Each of the plurality of UEs 118 may correspond to a wireless device, such as a client device or a telecommunication hardware used by an end-user to communicate. Some of the plurality of UEs 118 may refer to a combination of a mobile equipment and subscriber identity module (SIM). Examples of the plurality of UEs 118 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

Currently, in WLAN technology, the 2.4 GHZ and 5 GHz frequency bands are unlicensed spectrums that limited and congested and when running high-bandwidth applications, existing Wi-Fi networks inevitably encounter low quality of service (QoS). More advanced WLAN technology, like the IEEE 802.11be (Wi-Fi® 7) is being developed with higher data rate capability, such as theoretical capacity of up to 30 Gbps (e.g., assuming ideal conditions like clear line-of-sight, single user, and no interference) while 5-10 Gbps is a more realistic expectation in practical scenarios. There are many factors affecting practical capacity, such as signal interference from nearby devices, appliances, and even weather can disrupt signals, reducing throughput. In another example, distance from access point is also another factor where signal strength weakens with distance, impacting achievable speeds. In yet another example, sharing bandwidth among multiple users reduces individual speeds. One of the main objectives of Wi-Fi® 7 is to make full use of up to 1.2 GHz spectrum resources in the 6 GHz band. However, it is increasingly becoming evident that to effectively utilize these frequency resources, Wi-Fi® 7 or more advanced WLAN technologies may have to coexist with other different technologies operating in the same band, such as IEEE 802.11ax (or IEEE 802.11be) and 5G on the unlicensed band. Coexistence among wireless networks is challenging, especially when these networks are heterogeneous. Densely deployed sub-6 or 6-7.125 GHz WLANs alone may not provide the seamless connectivity required by mobile services and the rapid increase in mobile data traffic in future wireless networks. As a result, one of the main advancements in the network design for WLAN relies on integrating multiple different bands (e.g., microwave and mmWave). Wireless mesh networks (WMNs) are anticipated to resolve the limitations and to significantly improve the performance of ad hoc networks, wireless local area networks (WLANs), wireless personal area networks (WPANs), and wireless metropolitan area networks (WMANs). However, legacy wireless systems face inconsistencies around throughput, resilience, and complexity, where latency and signal noise are other technical problems with existing wireless communication systems and network architecture. Such latency increases when more wireless access points or relay nodes are introduced in the network to extend the communication range. Further, collision avoidance in wireless networks is a significant problem, especially with traditional wireless mesh networks and WLAN systems. Typically, collisions occur when multiple devices attempt to transmit data simultaneously on a shared wireless channel, resulting in corrupted data and reduced network performance.

In contrast to the conventional systems, in the present disclosure, the virtual fiber communication system 100A may be an advanced backhaul wireless communication system that significantly improves the current spectrum management regime by synergistically leveraging distributed ledger, telemetry information analytics, software-defined radios, and beamforming technologies. The virtual fiber communication system 100A is designed to address the challenges of the current wireless communication, including underutilized licensed spectrum assets, capacity shortages, and the need for more flexible and dynamic spectrum sharing models. The virtual fiber communication system 100A improves wireless connectivity by synergizing both mmWave and Wi-Fi® technologies, achieving unparalleled multi-Gbps speeds, sub-millisecond latencies, carrier-grade availability, and simplified operations. The virtual fiber communication system 100A provides an adaptable infrastructure that molds to diverse environments, from industrial campuses to entertainment venues, and leverages a blockchain-powered spectrum marketplace to decentralize access.

In operation, the central cloud server 102 may be configured to obtain the telemetry information 102C from the plurality of network nodes 104 of the wireless backhaul mesh network 108. The telemetry information 102C may be obtained from the plurality of network nodes 104 of the wireless backhaul mesh network 108 as well as one or more aggregation switches, such as the aggregation switch 110B. The telemetry information 102C may include the first type of telemetry information 102D obtained from the plurality of hybrid analog-digital repeater devices 114 in the wireless backhaul mesh network 108, and the second type of telemetry information 102E from the plurality of master WAP devices 112 and the one or more service WAP devices 116 in the wireless backhaul mesh network 108. The second type of telemetry information 102E may be different from the first type of telemetry information 102D. The first type of telemetry information 102D may be related to the state of the repeater devices themselves (i.e. performance of the plurality of hybrid analog-digital repeater devices 114), whereas the second type of telemetry information 102E may be related to the performance metrics and characteristics of the end-user devices connected to the WAP devices (the plurality of master WAP devices 112 and the one or more service WAP devices 116 in the network, providing insights into the user experience.

In accordance with an embodiment, each of the plurality of hybrid analog-digital repeater devices 114 may include the set of onboard sensors, which may capture sensor data to enrich each analog hybrid analog-digital repeater device with environmental awareness for intelligent intra-node and inter-node optimizations. The central cloud server 102 may be configured to obtain real-time or near real time telemetry information (i.e., the first type of telemetry information 102D) from the plurality of hybrid analog-digital repeater devices 114 including traffic loads, latency, signal quality metrics, interference levels, and the captured sensor data. The first type of telemetry information 102D obtained from the plurality of hybrid analog-digital repeater devices 114 may comprise a unique identifier (ID) of each of the plurality of hybrid analog-digital repeater devices 114, a geo-location of each of the plurality of hybrid analog-digital repeater devices 114, an operational state of the plurality of hybrid analog-digital repeater devices 114, and signal metadata of an incoming beam of RF signals at each of the plurality of hybrid analog-digital repeater devices 114. Each of the plurality of hybrid analog-digital repeater devices 114 may be assigned a unique identifier, allowing for individual identification, and tracking within via a WLAN mesh backchannel network (FIG. 1D). This helps in management, troubleshooting, and monitoring purposes. During the initial network set up phase, the central cloud server 102 may be further configured to acquire the geo-location of each of the plurality of hybrid analog-digital repeater devices 114 using a spatial position sensor provided in the set of onboard sensors of each hybrid analog-digital repeater device. The geo-location of each of the plurality of hybrid analog-digital repeater devices 114 may be in latitudes and longitudes pairs, which may be normalized by the central cloud server 102 to range between 0 and 1. Such preprocessing may also be done for other raw telemetry information (i.e., the first type of telemetry information 102D) obtained from the plurality of hybrid analog-digital repeater devices 114 and the preprocessed data may be stored in a cloud telemetry database in the central cloud server 102. The operational state of the plurality of hybrid analog-digital repeater devices 114 may indicate whether a given hybrid analog-digital repeater device is active and communicating one or more data streams with an upstream node or one or more downstream neighboring nodes, or not active and not communicating data streams to any of the one or more downstream neighboring nodes or the upstream node. The operational state may provide insights into whether each of the plurality of hybrid analog-digital repeater devices 114 are functioning properly, are offline, or experiencing issues. The monitoring of the operational state may be useful in proactive maintenance and fault detection.

In accordance with an embodiment, the first type of telemetry information 102D may include the signal metadata of the incoming beam of RF signals at each of the plurality of hybrid analog-digital repeater devices 114. The signal metadata may comprise timing information associated with a radio frame of the incoming beam of RF signals, system information, channel state information, a cell identity (ID), a beam ID, a signal strength, a signal to noise ratio (SNR), an interference level, or other signal quality metrics. The timing information associated with the radio frame of the incoming beam of RF signals may indicate timing characteristics of the incoming RF signals used for synchronization and coordination within the network. The timing information may include frame timing, which is indicative of a start and duration of the radio frame within which data is transmitted. This timing synchronization ensures that the transmitter and receiver are aligned, enabling accurate decoding of the transmitted information. The system information may include details about the wireless network parameters, such as cell identity (ID), a frequency band allocated to tune into the correct frequency for communication, system bandwidth that specifics the total bandwidth available for communication used to determine the maximum data rates supported by the network, a Modulation and Coding Scheme (MCS) that defines the modulation scheme and coding rate used for data transmission, transmission power levels indicative of available transmission power levels allowed in the network used to optimize coverage and interference. The channel state information may indicate the current state of the wireless communication channel between a transmitter and a receiver, and may include, for example, a channel response (indicates about signal attenuation, phase shifts, and multipath propagation), a channel frequency response (indicates how the channel responds to signals at different frequencies), Signal-to-Noise Ratio (SNR), channel capacity, spatial correlation (indicates the spatial characteristics of the channel, such as information about signal arrival angles and signal strengths from different directions), and channel coherence time (indicates the time duration over which the channel remains relatively constant).

In accordance with an embodiment, the central cloud server 102 may be further configured to obtain beam labels from each of the plurality of hybrid analog-digital repeater devices 114 as a part of the first type of telemetry information 102D. The beam labels may be obtained by activating an exhaustive beam search procedure and detecting the highest power beam available at each node. An initial dataset that may comprise location-beam pairs may be generated for different times of day. The location-beam pairs may be for multiple routes that pass through different neighboring nodes surrounding each of the plurality of hybrid analog-digital repeater devices 114. The initial dataset of the location-beam pairs may capture information about the possible routes and beams that can be used at different times of day when routing data signals through the network of plurality of hybrid analog-digital repeater devices 114 and their neighboring nodes. The data of location-beam pairs for different times may account for variations in conditions or interference that may impact which routes and/or beams are optimal in terms of signal strength and data throughput at different points in time.

In accordance with an embodiment, the first type of telemetry information 102D obtained from the plurality of hybrid analog-digital repeater devices 114 may further comprise surrounding-environment sensed information, which may be sensed by the set of onboard sensors at each of the plurality of hybrid analog-digital repeater devices 114. The surrounding-environment sensed information may comprise visual information surrounding of each of the plurality of hybrid analog-digital repeater devices 114, light detection and ranging (Lidar) sensor information, and motion tracking data of one or more moving objects surrounding each of the plurality of hybrid analog-digital repeater devices 114. The integration of sensor data, including visual information, Lidar sensor information, and motion tracking data, into telemetry information obtained from the plurality of hybrid analog-digital repeater devices 114 may be used to create a rich and detailed understanding of the environment surrounding each hybrid analog-digital repeater device. By combining data from multiple sensors, the central cloud server 102 may be configured to construct a unified 3D environmental model (may also be referred to as a unified 3D environmental representation) indicative of a holistic 3D representation of the surroundings, allowing it to capture visual details, accurately profile the environment in three dimensions, and track the movement of objects in real-time. In other words, a comprehensive digital twin representation of the network's surroundings may be generated using positional, motion, and thermal information. This integration enhances situational awareness within the network to respond effectively to dynamic environmental changes. The unified 3D environmental model may enable real-time or near real-time simulation, monitoring, and optimization of network performance, allowing for proactive maintenance, efficient resource allocation, and adaptive configuration. Furthermore, specific sensor capabilities such as radar-based motion detection and Lidar-based 3D profiling enable the central cloud server 102 to identify movement patterns, predict potential obstructions or blockers, and precisely align signal beams for optimal network coverage and efficiency.

In accordance with an embodiment, the first type of telemetry information 102D may further comprise vibration information indicative of a change in vibration detected at each of the plurality of hybrid analog-digital repeater devices 114. The central cloud server 102 may be configured to monitor vibration information over a period at each of the plurality of hybrid analog-digital repeater devices 114. An IMU sensor at each of the plurality of hybrid analog-digital repeater devices 114 may be configured to output raw IMU data, which may be processed to measure node vibrations, shocks, and orientation changes at each hybrid analog-digital repeater device.

In accordance with an embodiment, the first type of telemetry information 102D further may further comprise antenna array orientation change information indicative of a change in an orientation of a donor antenna and one or more service phased antenna arrays of each of the plurality of hybrid analog-digital repeater devices 114. The change in the orientation of the donor antenna and the one or more service phased antenna arrays may impact the quality of signal reception and transmission, so monitoring the antenna array orientation change information may be useful to determine if orientation changes may be contributing to issues like coverage holes or interference.

In accordance with an embodiment, the second type of telemetry information 102E obtained from each of the plurality of master WAP devices 112 and the one or more service WAP devices 116 may comprise user equipment (UE) related information of one or more UEs wirelessly connected to a corresponding wireless access point pertaining to a master WAP device and the one or more service WAP devices 116. In an implementation, the UE related information in the second type of telemetry information 102E may comprise a Received Signal Strength Indicator (RSSI), a throughput, a latency, a packet loss measurement, a channel utilization, an interference level, a retransmission or error rate, device information, and location data associated with each UE of the one or more UEs connected to the corresponding wireless access point.

In accordance with an embodiment, the central cloud server 102 may be further configured to establish dual radio access networks in an analog data plane among the plurality of network nodes 104 in the wireless backhaul mesh network 108 in which a first radio access network (e.g. a mmWave network) of the dual radio access networks is established using a first frequency spectrum and a second radio access network (e.g., Wi-Fi® or ISM) is established using a second frequency spectrum lower than the first frequency spectrum. The first frequency spectrum may be a licensed or unlicensed mm Wave spectrum that operate in a range of 10-300 GHz and the second frequency spectrum may be one of a wireless local area network (WLAN) frequency spectrum or an industrial, scientific, and medical (ISM) spectrum. Each network node may be equipped with radio transceivers capable of operating on both the mmWave and Wi-Fi®/ISM frequency spectra. Each network node may include one or more donor and service antennas that may support both mm Wave and Wi-Fi/ISM communications. For example, separate antennas may be optimized for each frequency range or multi-band antennas capable of operating across multiple frequencies, may be used. Each network node may utilize software-defined radio (SDR), which allows the radio hardware to be reconfigured and controlled on-the-fly, thereby allowing adaptation of the radio's operating parameters, such as frequency, modulation, and power, to support different radio access networks. The central cloud server 102 may establish a unified control plane that manages and coordinates the operation of both radio access networks across all network nodes and further causes each network node's computing resources, such as processing power and memory, to be virtualized and allocated to support the operation of both radio access networks concurrently. This control plane ensures seamless interoperability and resource sharing between the mmWave and Wi-Fi/ISM networks. The dual radio access networks approach may leverage the strengths of each technology, with mmWave providing high-capacity, low-latency connections and WLAN, for example, Wi-Fi® distribution, offering widespread coverage and compatibility. This converged backhaul system provides a harmonious interplay between the mmWave multi-hop mesh fabric and adaptive WLAN (Wi-Fi®) distribution network, interlocking their data transfer and control capabilities. The central cloud server 102 may be further configured to establish dual radio access networks using an interworking framework that controls the collaboration between mmWave and WLAN or ISM (e.g., Wi-Fi®) networks. The interworking framework may allow standards alignment, which ensures interoperability with Wi-Fi®, 5G NR, and open-RAN (Radio Access Network) standards, allowing for seamless integration of equipment from multiple vendors. This alignment facilitates a more flexible and cost-effective network deployment. The interworking framework further include a joint traffic steering operation, in which data flows are dynamically apportioned (i.e., data traffic divided and allocated between the mmWave and WLAN (Wi-Fi®) networks) based on their latency sensitivity and bandwidth requirements. This intelligent traffic management optimizes network performance by directing delay-sensitive traffic to the low-latency mmWave network while routing high-bandwidth flows to the WLAN (Wi-Fi®) network. The interworking framework further includes a service convergence operation, in which a common user plane may be used for Wi-Fi® and cellular services through General Packet Radio Service (GPRS) tunneling protocol (i.e., GTP tunneling). The service convergence operation enables unified service delivery across both networks, improving efficiency and reducing complexity. The interworking framework further includes a resource aggregation operation performed by the central cloud server 102, in which different spectrums, beams, and routes may be combined across the entire network fabric to enhance capacity and resilience. The routes may denote the paths that data packets take as they traverse the wireless backhaul mesh network 108 from source to destination. By aggregating these resources-spectrum, beams, and routes-across the entire network fabric, the central cloud server may dynamically allocate these resources based on real-time demand and network conditions. Thus, the virtual fiber communication system 100A may adapt to changing requirements by assigning more spectrum, directing beams, or optimizing routes to specific areas or applications as needed. This aggregation allows the system to dynamically allocate resources based on demand, ensuring optimal performance and reliability. The implementation of converged wireless routing may attain reliability at scale, balancing traffic across both optical and wireless links, creating a more resilient and flexible backhaul solution.

In accordance with an embodiment, the central cloud server 102 may be further configured to cause the plurality of hybrid analog-digital repeater devices 114 to dynamically form the wireless backhaul mesh network 108 among the plurality of master WAP devices 112, the plurality of hybrid analog-digital repeater devices 114 and the one or more service WAP devices 116, based on the telemetry information 102C. The wireless backhaul mesh network 108 may refer to the communication infrastructure that interconnects the plurality of master WAP devices 112, the one or more service WAP devices 116, and the plurality of hybrid analog-digital repeater devices 114 using point-to-point high-capacity wireless links. The mesh configuration allows for redundant paths and flexible routing of data traffic between the plurality of master WAP devices 112 and the one or more service WAP devices 116. The central cloud server 102 may be further configured to communicate a set of intra-node RF beam parameters and a set of inter-node RF beam parameters to each hybrid analog-digital repeater device over the WLAN mesh backchannel network for control and configuration purposes. Each of the plurality of hybrid analog-digital repeater devices 114 may then dynamically adjust their internal phase shifter settings and other parameters as per the received set of intra-node RF beam parameters. Concurrently, the plurality of hybrid analog-digital repeater devices 114 may coordinate their inter-node beams towards neighboring nodes based on the set of inter-node RF beam parameters to establish the multi-hop backhaul mesh topology. This dynamic centralized coordination combined with the localized enactment by the repeater nodes allows rapidly forming and re-configuring the resilient backhaul fabric in an automated manner.

Beneficially, each of the plurality of hybrid analog-digital repeater devices 114 (part of the plurality of network nodes 104) may include a set of onboard sensors, which may capture sensor data to enrich each analog hybrid analog-digital repeater device with environmental awareness for intelligent intra-node and inter-node optimizations. The plurality of hybrid analog-digital repeater devices 114 may be disposed as a bi-directional radio frequency (RF) bridge of data traffic between the plurality of master WAP devices 112 and the one or more service WAP devices 116 such that a data propagation path of user data relayed through a network of the plurality of hybrid analog-digital repeater devices 114 may be analog without any digital decoding or encoding of the user data in one or more beams of RF signals to reduce latency less than a threshold time. For example, the data propagation path may comprise high-frequency analog circuitry to minimize latency to nanoseconds. Multi-hop relaying of intermediate frequency signals (e.g., mmWave signals) may happen without any digital encoding or decoding of the user data (i.e., payload). Further, a backchannel connectivity and control of the network of the plurality of hybrid analog-digital repeater devices 114 may be via a WLAN frequency, based on a signal metadata of the relayed beam of RF signal. While the data propagation path may remain entirely analog for lowest latency, the plurality of hybrid analog-digital repeater devices 114 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture.

In accordance with an embodiment, the plurality of hybrid analog-digital repeater devices 114 may serve as a RF communication bridge between the plurality of master WAP devices 112 and one or more service WAP devices 116, which allows for the analog relay of user data through a network of the plurality of hybrid analog-digital repeater devices 114. The analog transmission of the user data reduces latency because there is no need for digital encoding and decoding processes, which can introduce delays. By transmitting user data (i.e., payload) in its original analog form, the virtual fiber communication system 100A achieves faster transmission times, making it suitable for applications that require real-time communication, such as data streaming, video streaming, online gaming, and the like. Further, separating the data propagation path and control connectivity ensures that control signals do not interfere with the data transmission path. This separation is beneficial for maintaining the quality of service and preventing degradation of the data transmission path. Further, utilizing parallel channels for control and data connectivity allows for simultaneous communication of control signals and data packets. By operating these channels independently, the virtual fiber communication system 100A prevents congestion and ensures that both control and data traffic receive sufficient bandwidth and priority. This approach enhances network stability and reliability, particularly in environments with high data traffic. By utilizing intermediate frequencies (e.g., mmWave frequencies or other intermediate frequencies in the range of 7-300 GHZ) for analog data transmission between the plurality of master WAP devices 112 and the one or more service WAP devices 116, the virtual fiber communication system 100A achieves low-latency communication, say microseconds, making it ideal for applications that require rapid response times. Furthermore, lower frequency signals typically have better penetration and coverage, making them suitable for control and coordination purposes. By leveraging lower frequency WLAN signals (e.g., Wi-Fi® signals at 2.4 or 5 GHZ) for backchannel communication, a reliable connectivity and coordination among the plurality of hybrid analog-digital repeater devices 114 may be provided. Alternatively stated, the intelligent combination of WLAN and mmWave signals enables hybrid coordination, leveraging the strengths of both technologies for optimized network performance. WLAN provides broader coverage and connectivity, while mmWave offers high-speed, low-latency communication. By synergistic integration of the plurality of hybrid analog-digital repeater devices 114 with the modified WAPs (the plurality of master WAP devices 112 and the one or more service WAP devices 116), the virtual fiber communication system 100A achieves responsive network-wide orchestration, enhancing overall network efficiency and responsiveness.

In accordance with an embodiment, the central cloud server 102 may be further configured to cause each hybrid analog-digital repeater device of the plurality of hybrid analog-digital repeater devices 114 to form dual analog data links on a first type of polarization and a second type of polarization with one or more neighboring hybrid analog-digital repeater devices in the wireless backhaul mesh network 108. The dual analog data links may correspond to two concurrent point-to-point wireless backhaul links among the plurality of hybrid analog-digital repeater devices 114. When a hybrid analog-digital repeater device is deployed in the wireless backhaul mesh network 108, it may establish two separate analog data links with its neighboring nodes: one link using the first type of polarization (e.g., vertical polarization) and another link using the second type of polarization (e.g., horizontal polarization). The dual analog data links may operate concurrently and independently. In an implementation, each of the plurality of hybrid analog-digital repeater devices 114 may perform receive (Rx) and transmit (Tx) operations on same type of polarization (e.g., the first type of polarization) at different time slot using time division duplexing (TTD). TDD allows the repeater device to use the same polarization for both Rx and Tx operations by allocating different time slots for each operation. This means that the repeater device can receive data on a specific polarization during one time slot and transmit data on the same polarization during another time slot. Similarly, each of the plurality of hybrid analog-digital repeater devices 114 may perform receive (Rx) and transmit (Tx) operations on second type of polarization at different time slot using TTD, thereby forming full duplex two concurrent bi-directional data paths using two different types of polarizations.

In an example, each of the plurality of hybrid analog-digital repeater devices 114 may transmit a first beam of RF signals carrying user data in an intermediate frequency band (e.g., mmWave frequency) in the first type of polarization over a first analog data link towards its neighboring repeater node, which then amplifies and relays the first beam of RF signals in the intermediate frequency (e.g., mmWave frequency) in the first type of polarization in the downstream communication. Similarly, for the upstream communication, each of the plurality of hybrid analog-digital repeater devices 114 may be configured to transmit a second beam of RF signals carrying user data in the intermediate frequency band in the first type of polarization over different time slot different towards its neighboring repeater node, which then amplifies and relays further the second beam of RF signal in the intermediate frequency band in the first type of polarization in the upstream communication. The first type of polarization may be different from the second type of polarization. An example of the first and the second type of polarization may be a vertical polarization state and a horizontal polarization state. In vertical polarization, the electric field component of the electromagnetic wave (i.e., the mmWave signal) oscillates vertically, meaning it moves up and down concerning the Earth's surface. In horizontal polarization, the electric field component of the electromagnetic wave (i.e., the mmWave signal) oscillates horizontally, moving side to side parallel to the Earth's surface. The downstream communication may refer one or more communication paths (e.g., one or more data propagation paths) from the plurality of master WAP devices 112 towards the one or more service WAP devices 116 via the network of the plurality of hybrid analog-digital repeater devices 114. Further, in the downstream communication, the one or more service WAP devices 116 may communicate corresponding user data to its corresponding UEs, such as the UEs 110a, 110b, and 110c. The upstream communication may refer to a communication path from the UEs and the one or more service WAP devices 116 towards the plurality of master WAP devices 112 via the network of the plurality of hybrid analog-digital repeater devices 114.

In accordance with an embodiment, the central cloud server 102 may be further configured to control the first radio access network (e.g., mmWave) and the second radio access network (e.g., ISM or WLAN) in the analog data plane via a common control plane which is distinct from the analog data plane. The analog data plane, where the actual data transfer occurs, may be separated from the control plane and may be operated in the analog domain. The centralized control plane enables the system to make intelligent decisions based on the overall network state, rather than relying on individual nodes to make decisions independently. The analog data plane ensures low-latency and high-speed data transfer, as it eliminates the need for digital processing at each node. Each network node may concurrently participate in both the mmWave and Wi-Fi/ISM radio access networks established by the central cloud server 102 where the common control plane may be used to manage and coordinate the operation of both radio access networks across all network nodes. This common control plane ensures seamless interoperability and resource sharing between the mm Wave and Wi-Fi/ISM networks.

The central cloud server 102 may be further configured to obtain frequency spectrum availability metadata and custom-defined access parameters from one or more spectrum owner nodes 110C. The spectrum availability metadata and custom-defined access parameters may enable the one or more spectrum owner nodes 110C or the central cloud server 102 to control and manage access to the unused licensed spectrum of the one or more spectrum owner nodes 110C. The frequency spectrum availability metadata may indicate the availability of specific frequency bands for use by the virtual fiber communication system 100A. The frequency spectrum availability metadata may be provided by the one or more spectrum owner nodes 110C, which may be entities that own or have the rights to use specific portions of the radio frequency spectrum. Each of the one or more spectrum owner nodes 110C may be configured to define their access rules and data routing logic using smart contracts, which encode authorization credentials, such as cryptographic keys, for allowing client devices to use the owned frequency bands. The frequency spectrum availability metadata may include information, such as a specific frequency ranges available for use, geographic areas where these frequencies can be used, the times or schedules when the frequencies are available, and any restrictions or limitations on the use of the frequencies. The custom-defined access parameters may define machine-readable rules and conditions set by the one or more spectrum owner nodes 110C that govern how their licensed frequency spectrum can be accessed and used by the virtual fiber communication system 100A and end users. The custom-defined access parameters may include access control policies (specifies which users or devices can access the spectrum), priority levels (specifies which types of traffic or applications have higher priority in using the spectrum), Quality of service (QoS) requirements (specifies the minimum acceptable levels of service quality for different types of traffic), revenue models (specifies the costs and payment methods for accessing the spectrum). The central cloud server 102 may be configured to utilize the spectrum availability metadata and custom-defined access parameters to configure the network nodes and manage the allocation of frequency spectrum resources according to the spectrum owners' requirements for enhanced spectrum utilization and spectrum sharing.

The central cloud server 102 may be further configured to detect spectrum availability variations across the plurality of network nodes 104 based on the obtained telemetry information 102C, the frequency spectrum availability metadata, and the custom-defined access parameters. Each of the plurality of network nodes 104 may further include a spectrum sensor (which may be a part of the set of onboard sensors). The spectrum sensor may be configured to detect available spectrum and report it to the central cloud server 102. The spectrum sensors of the plurality of network nodes 104 may provide real-time data about spectrum occupancy, noise levels, and interference, which may be used by the central cloud server 102, along with frequency spectrum availability metadata and custom-defined access parameters, to make informed decisions about spectrum allocation and network optimization. The virtual fiber communication system 100A may be configured to dynamically select nodes and beam directions to route authorized user traffic over the owned spectrum, based on real-time conditions, ensuring efficient utilization of the available frequency resources. By comparing the telemetry information 102C received in a real-time (including data from each spectrum sensor distributed across different locations at the plurality of network nodes) with the expected frequency spectrum availability and access parameters, the central cloud server 102 may detect variations in spectrum availability across the network nodes. For example, if the telemetry information 102C indicates that a particular frequency band is being used more heavily than expected, or if there are unexpected levels of noise or interference in one spectrum at certain network nodes, the central cloud server 102 may flag this as a spectrum availability variation.

In accordance with an embodiment, the central cloud server may be further configured to obtain a capacity increase request from a plurality of user equipment (UEs), such as the UE 118A or the UE 118B, to increase capacity for a specific time-period. User requirements for network capacity may vary significantly depending on factors such as location, time of day, and specific events. For example, during a large public event or a natural disaster, there may be a sudden surge in demand for network capacity in a specific area. In another example, some applications, such as real-time video streaming, online gaming, or remote surgery, may require higher network capacity to ensure a smooth and uninterrupted user experience (i.e., QoS requirements). In yet another example, users may anticipate a need for increased network capacity for a specific time period, such as when working on a data-intensive project or participating in a high-bandwidth video conference. By obtaining capacity increase requests from the plurality of UEs, the central cloud server 102 may dynamically allocate network resources to meet the specific needs of users. This ensures that the available network capacity is used efficiently and effectively. The central cloud server 102 provides a capability to the virtual fiber communication system 100A to allow users to request additional capacity for specific time periods, which ensure that the UE 118A or the UE 118B, have the necessary network resources to support their applications and services, resulting in a better overall user experience. Further, as the central cloud server 102 may have overall real-time network visibility, thus by analyzing patterns in user requests, the central cloud server 102 may predict future capacity requirements and proactively allocate resources to meet those needs.

Based on the detected spectrum availability variations across the plurality of network nodes 104, the central cloud server 102 may be further configured to control the plurality of network nodes 104 to inject additional capacity to one or more data sessions in the wireless backhaul mesh network 108 in a real-time or near real time when an increase in data traffic demand is detected in one or more data propagation paths across the plurality of network nodes 104 in the wireless backhaul mesh network 108. Based on the detected spectrum availability variations across the plurality of network nodes 104, the central cloud server 102 may be further configured to identify and allocate underutilized spectrum for additional capacity injection, which may lead to more efficient use of the available frequency resources, maximizing overall network performance. The detection of spectrum availability variations across the plurality of network nodes 104 improves spatial granularity. In other words, spectrum availability may vary significantly not only across different geographical locations due to factors such as terrain, building structures, and the presence of other wireless networks, but may vary also locally at different network nodes at different three-dimensional (3D) positions or locations within a zone or a given geographical location based on deployed position (e.g., a level of elevation, a distance from neighboring node, interference, presence of temporary signal blockers etc.) and location of each network node. By considering spectrum availability variations across multiple network nodes, the virtual fiber communication system 100A may identify localized opportunities for capacity injection that might be missed by a single-node analysis. This spatial granularity allows for more targeted and efficient allocation of additional capacity, ensuring that the resources are directed to the targeted and specific areas where they are needed the most. Thus, the virtual fiber communication system 100A approach of detecting spectrum availability variations across multiple network nodes, rather than relying on spectrum analysis by a single node, significantly enhances the efficiency and effectiveness of additional capacity injection. By analyzing spectrum availability variations across the plurality of network nodes 104 distributed at a plurality of different locations, the central cloud server 102 may gain a more comprehensive view of the overall spectrum utilization in the network. Each network node provides local spectrum sensing data, capturing the unique radio frequency environment in its vicinity. The central cloud server 102 may be configured to construct a spectrum occupancy map indicative of underutilized frequency bands and granular spatial variations in spectrum usage. Further, as spectrum availability varies over time due to factors such as the mobility of users and the activation or deactivation of other wireless networks, the central cloud server 102 may detect these changes in real-time across multiple nodes. The central cloud server 102 may be further configured to determine when and where to perform capacity injection in response to a change in traffic demands and spectrum usage variations. This distributed approach provides comprehensive spectrum visibility, improved spatial granularity, enhanced interference mitigation, increased flexibility and adaptability, and improved scalability and resilience compared to single-node spectrum analysis.

In an implementation, in order to inject the additional capacity, firstly, the central cloud server 102 may identify redundant paths and frequency bands that may be used to inject additional capacity into ongoing data sessions based on analysis of the telemetry information 102C received in a real time or near real time. Thereafter, the ASSP 102G of the central cloud server 102 may trigger smart contracts that may allocate the identified redundant paths and frequency bands to the existing data sessions requiring additional capacity. These smart contracts ensure that the capacity injection adheres to the spectrum owners' custom-defined access rules and data routing logic. The processor 102A of the central cloud server 102 may use the set of onboard sensors (e.g., environment-aware algorithms) to dynamically select certain relevant network nodes of the plurality of network nodes 104 and beam directions for routing the additional capacity over the owned spectrum, based on the telemetry information 102C received in a real-time (i.e., based on real-time conditions). Thus, the injection of additional capacity to existing data sessions may include dynamic allocation of extra network resources, such as bandwidth or frequency spectrum, to ongoing data transmissions in a real-time or near real-time. This is done to accommodate sudden increases in data traffic demand without disrupting the existing data sessions. For example, suppose there is a sudden surge in data traffic demand along a specific data propagation path due to a large public event in the area. The spectrum sensors distributed at the plurality of network nodes 104 may detect this increase in demand and may report it to the central cloud server 102. The central cloud server 102 may analyze the telemetry information 102C and identify an underutilized frequency band owned by a given spectrum owner in the vicinity. The central cloud server 102 may then trigger a smart contract that allocates the identified frequency band to the affected data sessions, following the custom-defined access parameters set by the given spectrum owner. The central cloud server 103 may then select the relevant network nodes and determine beam directions for routing the additional capacity, taking into account factors, such as interference levels and path reliability. As a result, the data sessions experiencing high traffic demand receive the required additional capacity in real-time, ensuring a smooth and uninterrupted user experience.

In accordance with an embodiment, the central cloud server 102 may be further configured to monitor a plurality of flow parameters of data streams associated with a plurality of UEs 118 served by the wireless backhaul mesh network 108 based on the obtained telemetry information 102C and the detected spectrum availability variations across the plurality of network nodes 104. The plurality of flow parameters may comprise two or more of: a bandwidth demand, a latency sensitivity, and a jitter tolerance. The flow parameters of a data stream may refer to the characteristics and requirements that define the nature and behavior of the data being transmitted over a network, such as the wireless backhaul mesh network 108. The bandwidth demand may represent the amount of network capacity required by a data stream to transmit its data effectively. The latency sensitivity may refer to the degree to which a data stream is affected by the delay in the transmission of its data packets. Jitter tolerance may refer to the ability of a data stream to handle variations in the arrival time of its data packets. The telemetry information 102C may include real-time data about network performance, such as bandwidth utilization, latency, jitter, and packet loss. The central cloud server 102 may identify data streams with high bandwidth requirements, such as high-definition video streaming or large file transfers, and those with lower bandwidth needs, such as voice calls or text messaging. The central cloud server 102 may assess the latency sensitivity of each data stream by measuring the end-to-end delay reported in the telemetry information 102C and may identify the data streams that are sensitive to latency, such as real-time gaming or video conferencing, and those that can tolerate higher latencies, such as email or background data synchronization. The central cloud server 102 may evaluate the jitter tolerance of each data stream by analyzing the variation in packet arrival times in the telemetry information 102C. The central cloud server 102 may identify the data streams that are sensitive to jitter, such as voice-over-IP (VOIP) or live video streaming, and those that can tolerate higher levels of jitter, such as web browsing or file downloads.

The central cloud server 102 may be further configured to determine a set of alternative analog data propagation paths either over the first radio access network corresponding to a mm Wave mesh network or over the second radio access network corresponding to a wireless local area network (WLAN) network to serve the plurality of UEs 118, based on the monitored plurality of flow parameters of data streams associated with the plurality of UEs 118. The set of alternative analog data propagation paths may refer to the different physical routes or paths that data can take when being transmitted from one point to another within the wireless backhaul mesh network 108. Based on the monitored flow parameters, the central cloud server 102 may determine the most suitable analog data propagation paths for each UE. The central cloud server 102 may take into account the specific requirements of each data stream and the available network resources to make this decision. For example, for data streams that require high bandwidth and low latency, such as high-definition video streaming or real-time gaming, the central cloud server 102 may select the mm Wave mesh network as the preferred analog data propagation path, whereas for data streams that have lower bandwidth requirements and may tolerate higher latencies, such as email or background data synchronization, the central cloud server 102 may select the WLAN network as the suitable analog data propagation path. If the requirements of a data stream change or the network conditions vary, the central cloud server 102 may dynamically adjust the propagation paths to maintain the desired or set quality of service.

In accordance with an embodiment, the central cloud server 102 may be further configured to prioritize data packets over the plurality of network nodes 104 based on a type-of-service requested by a user equipment (UE) of the plurality of UEs 118 served by the wireless backhaul mesh network 108, and the custom-defined access parameters from the one or more spectrum owner nodes 110C. By analyzing the type-of-service requested by a UE, such as low-latency gaming or high-bandwidth video streaming, the central cloud server 102 may assign higher priority to data packets associated with these services. Additionally, the custom-defined access parameters set by the one or more spectrum owner nodes 110C may specify prioritization rules based on specific requirements of spectrum owners, such as giving higher priority to certain types of traffic or users. The central cloud server 102 may take the custom-defined access parameters into account when making prioritization decisions, ensuring that the spectrum owners' preferences are met. This prioritization mechanism offers several advantages, including improved quality of service for high-priority applications, efficient utilization of network resources, and the ability to accommodate the specific needs of both UEs and spectrum owners. The smart contracts may enforce user identity verification, bespoke access durations, dynamic capacity boosting assurance, highlighting the ability to prioritize data packets based on predefined criteria and the central cloud server 102 may enforce such priorities using smart contracts.

In accordance with an embodiment, the central cloud server 102 may be further configured to cause each of the plurality of network nodes 104 to detect a local interference and congestion event based on the obtained telemetry information 102C. The central cloud server 102 may be further configured to cause each of the plurality of network nodes 104 to calibrate radio frequency (RF) parameters including a transmit power, a transmit frequency, or a beam orientation based on the detected local interference and congestion event. When a network node detects a local interference or congestion event, the central cloud server 102 may instruct the network node to calibrate its radio frequency (RF) parameters, such as transmit power, transmit frequency, or beam orientation. By adjusting these parameters dynamically, the network node may mitigate the impact of interference and congestion, ensuring that data transmission remains reliable and efficient. For example, if a network node detects high levels of interference on a particular frequency, it can switch to a different frequency or adjust transmit power to minimize the impact of the interference. Similarly, if a node detects congestion on a specific beam orientation, it can adjust its beam steering to route data through less congested paths. This dynamic calibration of RF parameters offers several advantages, including improved network resilience, reduced latency, and increased throughput.

In an example, the plurality of network nodes 104 in the virtual fiber communication system 100A may dynamically switch between the 28 GHZ, 7 GHZ (WLAN), and 39 GHZ frequency bands in response to changing network conditions. In this example, the network nodes may be equipped with tri-band radios capable of operating on the 28 GHZ, 39 GHz, and 7 GHZ frequency bands. The central cloud server 102 may obtain the telemetry information 102C including Received Signal Strength Indicator (RSSI), Signal-to-Noise Ratio (SNR), and Packet Error Rate (PER) for each frequency band. In an initial scenario, the plurality of network nodes 104 may be operating on the 28 GHz mmWave band, providing high-speed, low-latency connectivity to the plurality of UEs 118. The telemetry information 102C may indicate stable RSSI, high SNR, and low PER, suggesting optimal network performance. Then in the next scenario, interference may be detected on the 28 GHz band. Certain or all the network nodes may detect a sudden drop in RSSI and SNR values on the 28 GHz band, along with an increase in PER. The telemetry information 102C may indicate the presence of a strong interference source disrupting the 28 GHz band. The central cloud server 102, upon analyzing the data from multiple network nodes, may confirm the presence of a localized interference event. To mitigate the impact of interference, the central cloud server 102 may instruct the affected nodes to switch to the 7 GHZ WLAN band. Thereafter, the affected network nodes may seamlessly switch to the 7 GHZ WLAN band, ensuring continuity of service for users. The 7 GHz band, although having lower bandwidth compared to the 28 GHz band, may provide a stable and interference-free connection. The telemetry information 102C on the 7 GHz band may indicate acceptable RSSI, SNR, and PER values, confirming the suitability of this band for temporary operation. Further, in another consecutive scenario, say, over time, as more nodes switch to the 7 GHz band due to the interference on the 28 GHz band, congestion may start to build up. The central cloud server 102 may detect a gradual decrease in SNR and an increase in PER on the 7 GHz band, indicating rising congestion levels. To alleviate the congestion and provide a higher-quality service, the central cloud server 102 may cause affected nodes to switch to the 39 GHz mm Wave band. The instructed network nodes may seamlessly transition to the 39 GHz band, leveraging its high-speed, low-latency characteristics. The telemetry information 102C on the 39 GHz band may indicate high RSSI, high SNR, and low PER, confirming the optimal performance of this band. Meanwhile, the central cloud server 102 may continue to monitor the 28 GHz band and may detect that the interference source has subsided. Thereafter, the central cloud server 102 may instruct a subset of nodes to switch back to the 28 GHz band to distribute the load and optimize spectrum utilization. The instructed subset of nodes may seamlessly transition back to the 28 GHz band, while some nodes remain on the 39 GHz band to maintain a balanced network load. Thus, in this way, the virtual fiber communication system 100A may dynamically switch between different frequency bands (28 GHz, 7 GHZ WLAN, and 39 GHz and other frequencies) in response to changing network conditions such as interference and congestion. By continuously monitoring telemetry information 102C and making intelligent decisions based on the analysis, the central cloud server 102 may ensure reliable and efficient network operation, even in the face of challenging wireless environments. The seamless transitions between frequency bands highlight the system's flexibility and adaptability, allowing it to maintain a high-quality user experience by leveraging the strengths of each band. The use of the 7 GHZ WLAN band as a temporary fallback option showcases the system's multi-band capabilities and its ability to leverage different technologies (mmWave and WLAN) to ensure continuous connectivity. In some cases, both the mmWave frequency and WLAN frequencies may be executed concurrently to maximize spectrum efficiency, ensuring that each band is used optimally based on the specific requirements of different applications.

In accordance with an embodiment, the virtual fiber communication system 100A finds applications in Fixed Wireless Access (FWA), where fixed wireless internet connectivity may be provided to homes and businesses in areas where fiber or cable infrastructure is limited or unavailable. The virtual fiber communication system 100A may be further used to provide backhaul connectivity for cellular base stations, extending the reach of mobile networks to remote or underserved areas. Furthermore, the virtual fiber communication system 100A may be deployed to create private wireless networks for enterprises, campuses, and other organizations, providing secure and dedicated connectivity for mission-critical applications.

Figure 1B:
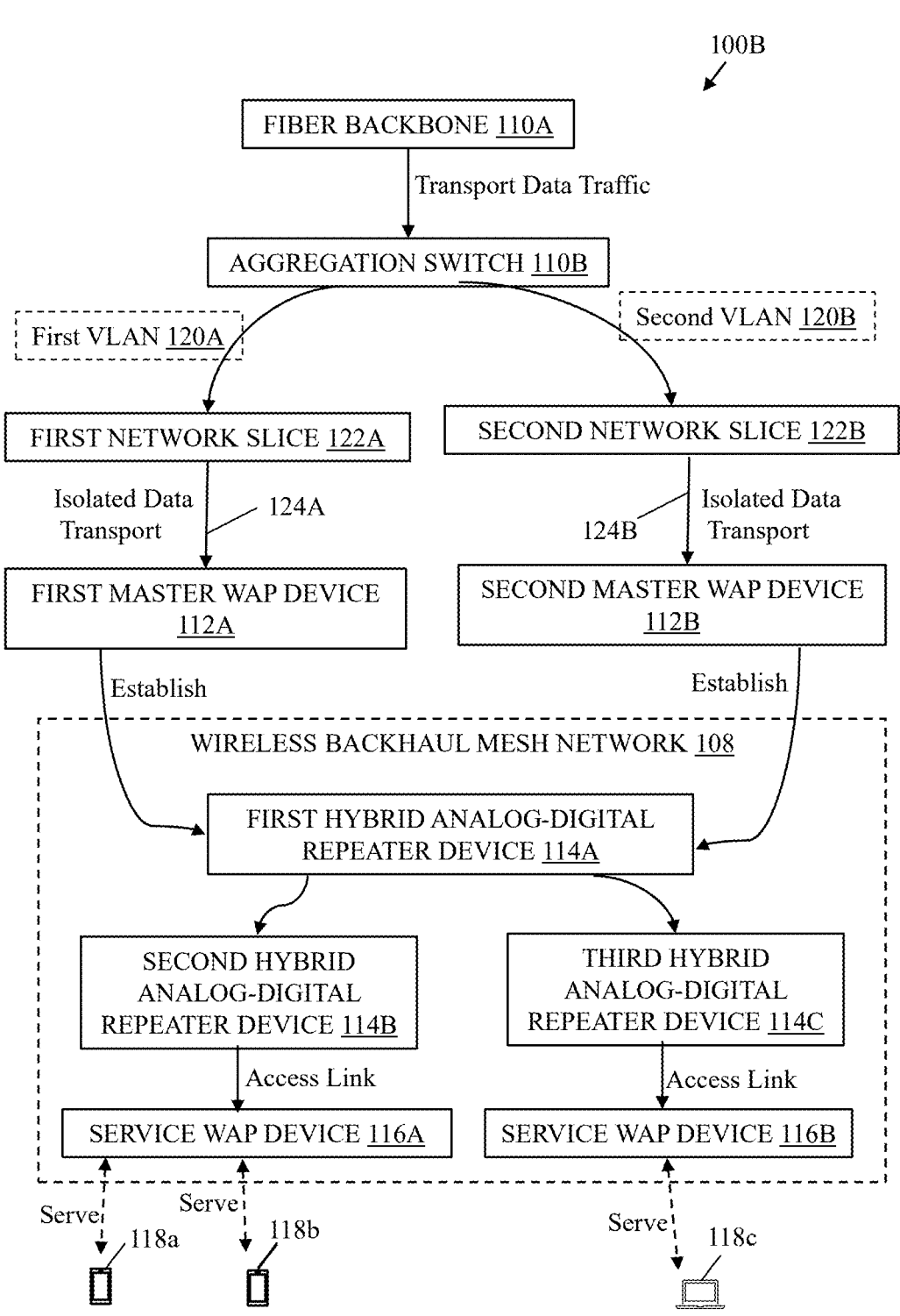
FIG. 1B is a diagram that illustrates an exemplary virtual fiber communication system for spectrum availability-based control of wireless backhaul mesh network for high-performance, ultra-reliable, and ultra-low latency communication, in accordance with another exemplary embodiment of the disclosure.

FIG. 1B is a diagram that illustrates an exemplary virtual fiber communication system for spectrum availability-based control of wireless backhaul mesh network for high-performance, ultra-reliable, and ultra-low latency communication, in accordance with another exemplary embodiment of the disclosure. FIG. 1B is explained in conjunction with elements from FIG. 1A. With reference to FIG. 1B, there is shown a virtual fiber communication system 100B.

The virtual fiber communication system 100B may also be referred to as a backhaul wireless communication system designed to provide reliable, high-speed connectivity to end-user devices by bridging the gap between fiber and wireless access devices. The virtual fiber communication system 100B may include several layers, each with its own components and functions, working together seamlessly to enable flexible, secure, and reliable communication.

In accordance with an embodiment, the fiber backbone 110A may be the first layer, for example, of fiber optic cables, in the virtual fiber communication system 100B providing the necessary bandwidth and reliability to support a wireless access layer of the wireless backhaul mesh network 108. The wireless access layer may include the access points, such as the plurality of master WAP devices 112 and the one or more service WAP devices 116 that provide high-speed connectivity to the end-user devices 106. The virtual fiber communication system 100B may include the aggregation switch 110B, which may be communicatively coupled to a core fiber backhaul link, such as the fiber backbone 110A, to control traffic flow and routing between the core fiber backhaul link, such as the fiber backbone 110A, and the plurality of master WAP devices 112 in an isolated network slice.

In the virtual fiber communication system 100B, the plurality of network nodes 104 may include the plurality of master WAP devices 112, where each master WAP device (e.g., the first master WAP device 112A and the second master WAP device 112B) may be associated with an isolated network slice of one of a plurality of different network service providers. For example, the first master WAP device 112A may be associated with a first network slice 122A and the second master WAP device 112B may be associated with a second network slice 122B isolated from the first network slice 122A. The isolation of network slices ensures that the traffic, data, and performance of one slice do not interfere with or affect the others. This allows the central cloud server 102 to offer customized services with guaranteed quality of service (QoS) to different clients or applications, as each slice can be optimized for specific requirements, such as low latency, high bandwidth, or enhanced security. The logically isolated network slices, such as the first network slice 122A and the second network slice 122B, created on common infrastructure allow the central cloud server 102 to assign unique capacity and latency parameters to each slice. This means that the physical network infrastructure may be shared among different slices, but each slice may be virtually separated and can be configured with its own dedicated resources and performance characteristics. For example, one slice can be allocated with high bandwidth and low latency for real-time applications like video streaming or gaming, while another slice can be assigned with moderate bandwidth and higher latency for less demanding services like email or file transfer. This flexibility enables the central cloud server 102 to optimize the network resources based on the specific requirements of different services provided by the plurality of different network service providers or the end-user devices 106, ensuring efficient utilization of the infrastructure and improved overall network performance.

In the virtual fiber communication system 100B, the plurality of network nodes 104 may include the plurality of hybrid analog-digital repeater devices 114 (e.g., the first hybrid analog-digital repeater device 114A, the second hybrid analog-digital repeater device 114B, and the third hybrid analog-digital repeater device 114C) disposed at a plurality of different locations and may be interconnected in a mesh topology via point-to-point wireless backhaul links configured as virtual fibers in the wireless backhaul mesh network 108. The plurality of hybrid analog-digital repeater devices 114 may be strategically deployed at different locations to ensure optimal coverage and connectivity within the wireless backhaul mesh network 108. The deployment may take into account factors such as line-of-sight, distance between repeaters, and potential obstacles to ensure reliable point-to-point wireless backhaul links.

In accordance with an embodiment, the plurality of hybrid analog-digital repeater devices 114 may have a compact, all-in-one form factor with integrated antennas that may be easily mounted on any elevated structure, such as light poles, building facades, roof tops, water tanks etc. The plurality of hybrid analog-digital repeater devices 114 are configured to be mounted flexibly using affixing means, like metallic straps, clamps, and brackets, which may allow securing the repeaters firmly on poles, walls, billboards, traffic lights, parking lots, shopping centers, or railings without any structural modifications. Each of the plurality of hybrid analog-digital repeater devices 114 may include a plug-and-play power and network connectivity feature that allows rapid site rollouts by simply mounting and powering up repeaters, skipping complex field cable routing or antenna tuning.

In accordance with an embodiment, the plurality of hybrid analog-digital repeater devices 114 may be rapidly deployed in emergency response and disaster recovery situations. For example, some of the plurality of hybrid analog-digital repeater devices 114 may be installed in mobile command vehicles and/or on autonomous drones for pop-up coverage and aerial connectivity across hard-to-reach areas. The central cloud server 102 may be further configured to coordinate and perform adaptive autonomous reconfiguration of the temporary infrastructure mesh topology based on environmental factors and first responder movements. The central cloud server 102 may be further configured to auto-discover and bring up new repeater nodes added over time through zero-touch provisioning.

In accordance with an embodiment, the central cloud server 102 may be further configured to facilitate artificial intelligence (AI)-augmented (e.g., the neural network model 102B guided) deployment of the plurality of hybrid analog-digital repeater devices 114. The central cloud server 102 may be configured to obtain high-resolution 3D digital maps containing geospatial data on terrain, foliage, and buildings for area where the plurality of hybrid analog-digital repeater devices 114 are to be deployed. Relevant information like structure heights and construction materials are automatically extracted using computer vision techniques on the map imagery. The neural network model 102B may be configured to analyze the 3D digital maps to identify mounting locations for the plurality of hybrid analog-digital repeater devices 114, meeting RF line-of-sight, installation feasibility, and coverage objectives, outputting a priority-ordered list of location-tagged viable installation sites across the intended coverage zone for field deployment. For solar-powered rural installations, the central cloud server 102 may utilize irradiance data and structure shading analysis to determine suitable solar panel sizing and placement specifications ensuring sustained power for the plurality of hybrid analog-digital repeater devices 114. By use of the selected mounting locations, the central cloud server 102 may simulate mesh network for mmWave channel propagation under various beamforming, power, and frequency settings, predicting associated wireless metrics like link SNRs and interference to determine optimal RF configuration parameters for the hardware configuration of the plurality of hybrid analog-digital repeater devices 114. The compact all-in-one design of the plurality of hybrid analog-digital repeater devices 114 minimizes installation complexity, involving just mounting rather than field-level antenna tuning or RF adjustments. The plurality of hybrid analog-digital repeater devices 114 may establish line-of-sight mesh links. For newly added hybrid analog-digital repeater devices among the plurality of hybrid analog-digital repeater devices 114, the central cloud server 102 may auto-assign network parameters, security credentials, and configuration based on each device's role and mesh connections using zero-touch provisioning, eliminating manual IP address assignment or antenna calibration tasks during deployment. By fusing geospatial data with AI-driven planning and network simulation, the installation of the plurality of hybrid analog-digital repeater devices 114 may be deployed with improved ease delivering carrier-grade wireless backhaul.

The virtual fiber communication system 100B may include one or more service WAP devices 116 configured to perform Multi-User, Multiple Input, Multiple Output (Mu-MIMO) to corresponding connected UEs via corresponding mmWave New Radio Unlicensed (NR-U) links or licensed links in some cases. The use of millimeter-wave frequencies and Mu-MIMO together may provide high data rates and efficient use of the available spectrum. Millimeter-wave frequencies offer increased bandwidth, and Mu-MIMO enhances the overall network capacity by enabling simultaneous communication with multiple user devices. This may result in improved throughput and reduced latency, contributing to a more robust and high-performance wireless communication system, particularly in the context of 5G NR-U deployments.

In operation, the central cloud server 102 may be configured to cause the first master WAP device 112A of the plurality of master WAP devices 112 to receive a first data stream 124A associated with a first network service provider over a first virtual local area network (VLAN) 120A from the aggregation switch 110B and the second master WAP device 112B of the plurality of master WAP device 112 to receive a second data stream 124B associated with a second network service provider over a second VLAN 120B from the aggregation switch 110B, which may be coupled to a core fiber backhaul link to control traffic flow and routing among the core fiber backhaul link and the plurality of master WAP devices 112 in the isolated network slice. The aggregation switch 110B may be configured to support multiple VLANs, allowing it to segregate traffic from different network service providers. In an example, VLAN tagging may be employed to identify and separate data streams associated with each network service provider. The first data stream 124A from the first network service provider may be tagged with a unique VLAN ID corresponding to the first VLAN 120A, while the second data stream 124B from the second network service provider may be tagged with a different VLAN ID corresponding to the second VLAN 120B. The aggregation switch 110B may forward the tagged data streams to the respective master WAP devices based on the VLAN IDs. The first master WAP device 112A may be configured to recognize and process traffic tagged with the first VLAN ID, while the second master WAP device 112B may be configured to recognize and process traffic tagged with the second VLAN ID. This ensures that each master WAP device receives only the data stream associated with its corresponding network service provider. Further, the use of VLANs enables network slicing, allowing multiple network service providers to share the same physical infrastructure while maintaining logical isolation between their traffic. This promotes efficient utilization of network resources and reduces costs associated with deploying separate physical networks for each provider. Second, VLANs enhance security by preventing unauthorized access and data leakage between different network service providers. Each provider's traffic is confined within its designated VLAN, ensuring confidentiality and integrity. Third, VLANs facilitate flexible and dynamic network management. The central cloud server 102 may easily configure and modify VLAN assignments to accommodate changes in service provider requirements or network topology to support different policies or requirements of multiple network service providers within a shared infrastructure.

In accordance with an embodiment, the central cloud server 102 may be further configured to cause the first master WAP device 112A to communicate the first data stream 124A in a first intermediate frequency to the first hybrid analog-digital repeater device 114A of the plurality of hybrid analog-digital repeater devices 114. The central cloud server 102 may be further configured to cause the second master WAP device 112B to communicate the second data stream 124B in a second intermediate frequency to the first hybrid analog-digital repeater device 114A of the plurality of hybrid analog-digital repeater devices 114. The first master WAP device 112A and the second master WAP device 112B may be configured to communicate their respective data streams 124A and 124B to a multi-operator converging network device, such as the first hybrid analog-digital repeater device 114A, using different intermediate frequencies. This frequency separation allows the first hybrid analog-digital repeater device 114A to distinguish and process the data streams independently.

In accordance with an embodiment, the central cloud server 102 may be further configured to cause the first hybrid analog-digital repeater device 114A of the plurality of hybrid analog-digital repeater devices 114 to receive the first data stream 124A in the first intermediate frequency from the first master WAP device 112A and the second data stream 124B in the second intermediate frequency from the second master WAP device 112B. The first intermediate frequency and the second intermediate frequency are different and within a range of 7-300 GHz. The first hybrid analog-digital repeater device 114A may be equipped with frequency-selective components, such as filters and multiplexers, that enable it to separate and process the received signals based on their respective intermediate frequencies. This frequency diversity enables the efficient utilization of the wireless spectrum and prevents interference between the data streams. The central cloud server 102 allows the first hybrid analog-digital repeater device 114A to relay the data streams separately to the next repeater device in the chain, preserving the logical isolation between the network service providers. This approach ensures the integrity and security of each provider's data while enabling them to share the same physical infrastructure, thereby reducing costs and increasing flexibility in network deployment. The use of intermediate frequencies in the 7-100 GHz (maybe up to 300 GHZ) range may enable the deployment of high-capacity wireless backhaul links between the master WAP devices and the repeater devices. These frequencies offer ample bandwidth to support the growing demand for data traffic and can accommodate advanced modulation schemes and beamforming to further enhance the capacity and reliability of the wireless links.

In accordance with an embodiment, the central cloud server 102 may be further configured to cause the first hybrid analog-digital repeater device 114A to relay the first data stream 124A and the second data stream 124B over the plurality of hybrid analog-digital repeater devices 114 via the point-to-point wireless backhaul links to reach to one or more service WAP devices 116. The plurality of hybrid analog-digital repeater devices 114 may intelligently multiplex and demultiplex the data streams, ensuring that each stream is delivered to its intended service WAP device without interference or data leakage. The plurality of hybrid analog-digital repeater devices 114 may utilize software-defined networking (SDN) to create virtualized network slices for each network service provider, where each network slice may have its own dedicated resources, such as bandwidth, processing power, and storage, ensuring isolation and performance guarantees for each data stream.

In accordance with an embodiment, the central cloud server 102 may be configured to execute allocation of network slices for the plurality of different network service providers through airtime scheduling over the plurality of hybrid analog-digital repeater devices 114 via a backchannel mesh network in a control plane distinct from the point-to-point wireless backhaul links in the wireless backhaul mesh network 108. The same physical infrastructure of the plurality of hybrid analog-digital repeater devices 114 may be concurrently accessed and shared between the plurality of different network service providers while maintaining isolation of data traffic and services between the plurality of different network service providers. The central cloud server 102 may leverage the hybrid analog-digital repeater devices 114 to create virtualized network slices, each dedicated to a specific network service provider. These network slices may be logical partitions of the physical infrastructure, allowing multiple service providers to concurrently access and share the same resources while maintaining isolation of data traffic and services. The airtime scheduling mechanism employed by the central cloud server 102 ensures efficient and fair allocation of network resources among the different service providers. The central cloud server 102 may dynamically assigns time slots or frequency channels to each network slice based on factors such as bandwidth requirements, quality of service (QoS) parameters, and service-level agreements (SLAs). This dynamic allocation may optimize the utilization of the available spectrum and ensures that each service provider receives the necessary resources to meet their service demands. The backchannel mesh network, operating in a separate control plane, may enable seamless coordination and management of the network slices by the central cloud server 102. It allows for the exchange of control messages, configuration updates, and performance metrics between the central cloud server 102 and the plurality of hybrid analog-digital repeater devices 114 without interfering with the data traffic in the wireless backhaul mesh network 108. Beneficially, the allocation of network slices through airtime scheduling enables multi-tenancy support where multiple network service providers may concurrently access and share the same physical infrastructure, reducing costs and increasing the efficiency of resource utilization. Further, the central cloud server 102 may dynamically adjust the allocation of network resources based on the changing requirements of the service providers. It can easily accommodate the addition of new service providers or the modification of existing network slices, providing a flexible and scalable solution for multi-tenancy support. Each network slice may be customized to meet the specific requirements of the corresponding service provider. The central cloud server 102 may allocate resources and apply service-specific policies to ensure that each slice delivers the desired performance, QoS, and security levels.

In accordance with an embodiment, the central cloud server 102 may be further configured to prioritize data packets over the plurality of hybrid analog-digital repeater devices 114 based on a type-of-service requested by a UE of the plurality of UEs 118 and a unique latency parameter defined for each of the plurality of different network service providers. The type-of-service requested by a UE can vary depending on the application or service being used. For example, a UE running a real-time video streaming application may require low latency and high bandwidth, while a UE performing background data synchronization may tolerate higher latency. The central cloud server 102 may identify the type-of-service based on factors such as the application type, QoS parameters, or explicit service requests from the UEs as a part of the second type of telemetry information 102E. In addition to the type-of-service, each network service provider may have a unique latency parameter defined in their SLA. This latency parameter specifies the maximum acceptable delay for data transmission within their network slice. The central cloud server 102 may take into account these unique latency parameters when prioritizing data packets across the hybrid analog-digital repeater devices 114.

In an example, the central cloud server 102 may be further configured to prioritize data packets by following prioritization process. The central cloud server 102 may cause the one or more service WAP devices 116 to receive data packets from the UEs, along with the associated type-of-service information. The one or more service WAP devices 116 may be configured to identify the network service provider responsible for each data packet based on the UE's subscription or the network slice associated with the packet. The one or more service WAP devices 116 may be configured to determine the priority of each data packet by considering both the type-of-service and the unique latency parameter of the corresponding network service provider. The one or more service WAP devices 116 may be configured to assign higher priority to data packets with stringent latency requirements and critical type-of-service, ensuring that they are transmitted ahead of lower-priority packets. The one or more service WAP devices 116 in coordination with the central cloud server 102 may dynamically schedule the transmission of data packets across the plurality of hybrid analog-digital repeater devices 114 based on their assigned priorities, ensuring that high-priority packets experience minimal latency.

In accordance with an embodiment, the central cloud server 102 may be further configured to change a frequency ranging from 7 GHz to 300 GHz or a type of polarization for the relay of the first data stream 124A or the second data stream 124B over the plurality of hybrid analog-digital repeater devices 114 via the point-to-point wireless backhaul links to reach to one or more service WAP devices 116, based on the first type of telemetry information 102D and the second type of telemetry information 102E. By analyzing the telemetry information 102C (i.e., the first type of telemetry information 102D and the second type of telemetry information 102E), the central cloud server 102 may make intelligent decisions to optimize the wireless backhaul network's performance by dynamically changing the frequency or polarization used for relaying the data streams based on the current network conditions and requirements. For example, changing the frequency allows the central cloud server 102 to adapt to varying channel conditions and interference levels. For example, if the telemetry information 102C indicates high interference at a particular frequency, the central cloud server 102 can switch to a different frequency within the 7 GHz to 300 GHz range to mitigate the interference and ensure reliable data transmission. This frequency agility enhances the robustness and resilience of the wireless backhaul mesh network 108. Similarly, changing the type of polarization enables the central cloud server 102 to optimize the signal quality and reduce interference. Different polarizations, such as vertical, horizontal, or circular polarization, can be used to minimize cross-polarization interference and improve signal isolation. By selecting the optimal polarization based on the telemetry information 102C, the central cloud server 102 may enhance the signal-to-noise ratio (SNR) and increase the overall capacity of the wireless backhaul network.

In accordance with an embodiment, the central cloud server 102 may be further configured to cause each hybrid analog-digital repeater device of the plurality of hybrid analog-digital repeater devices 114 to concurrently relay the first data stream 124A associated with the first network service provider on the first type of polarization and the second data stream 124B associated with the second network service provider on the second type of polarization.

In accordance with an embodiment, the central cloud server 102 may be further configured to cause the plurality of hybrid analog-digital repeater devices 114 in the wireless backhaul mesh network 108 to relay the first data stream 124A on the first type of polarization corresponding to a first analog data link of the dual analog data links while the second type of polarization is used as a spare polarization to transmit probing signals in different directions for discovery of a new UE without affecting the first analog data link. The probing signals transmitted on the second type of polarization may comprise device identifiers allowing the new UE or other UEs to report channel measurements back to a corresponding hybrid analog-digital repeater device of the plurality of hybrid analog-digital repeater devices 114. The spare polarization may be used to scan the environment, enabling improved mapping of external objects without affecting the first analog data link. The scanning process on the second polarization may operate independently and may not interfere with the data transmission on the first type of polarization. The technique of relaying the data traffic on the first type of polarization and using the second type of polarization to determine the location and the movement pattern of the new UE may be done to maintain high network performance and reliability. By using the spare polarization for user discovery, the virtual fiber communication system 100B may seamlessly detect and establish links with new UEs without affecting the existing data links operating on the first polarization. This intelligent use of available resources through polarization diversity enhances the system's ability to dynamically expand its coverage and capacity while maintaining uninterrupted service for existing users.

In accordance with an embodiment, the central cloud server 102 may be further configured to perform a rotational beam sweeping sequence across azimuth and elevation angles in a defined step angle using the spare polarization for the discovery of the new UE. The central cloud server 102 may cause the plurality of hybrid analog-digital repeater devices 114 to execute a first beam sweep in an azimuth plane with a defined step angle size, covering the 0° to 360° azimuth angular span with a defined stop dwell time at each step angle. At each defined step angle, each hybrid analog-digital repeater device may pause the beam rotation for a specified dwell time, e.g., around or less than 50 milliseconds, to acquire and process data related to signal quality, interference levels, and other relevant metrics in that specific direction. The central cloud server 102 may then aggregate and analyze the data to detect potential new UE directions by tuning the step angle size and stop dwell time based on the findings. The central cloud server 102 may further cause the plurality of hybrid analog-digital repeater devices 114 to execute a second beam sweep in an elevation plane with a defined step angle size spanning angles from −90° to +90° relative to the azimuth plane. Each hybrid analog-digital repeater device may pause at each angular position for a defined stop dwell time to detect potential new UE directions by tuning the step angle size or stop dwell time. This elevation plane sweep, combined with the azimuth sweep, provides a comprehensive 3D mapping of the area, enabling the central cloud server 102 to pinpoint the location of potential new UE, not only in terms of horizontal direction but also vertical position. This rotational beam sweeping across azimuth and elevation facilitates the discovery and integration of new UE into the network.

In accordance with an embodiment, the central cloud server 102 may be further configured to determine a location of the new UE when two or more analog-digital repeater devices of the plurality of hybrid analog-digital repeater devices 114 in the wireless backhaul mesh network 108 detect the same new UE from different directions. By leveraging the distributed nature of the wireless backhaul mesh network 108, when two or more hybrid analog-digital repeater devices of the plurality of hybrid analog-digital repeater devices 114 in the wireless backhaul mesh network 108 detect the same new UE from different directions, the central cloud server 102 may triangulate the UE's position based on the directional measurements reported by such hybrid analog-digital repeater devices. Each hybrid analog-digital repeater device may sense the direction from which a signal is received by analyzing metrics like signal strength, phase, and time of arrival. By combining the directional information from at least two different hybrid analog-digital repeater devices that have detected the new UE, the central cloud server 102 can calculate the point at which the lines along those directions intersect, effectively pinpointing the UE's location. The more hybrid analog-digital repeater devices that detect the UE from diverse vantage points, the higher the precision of the location estimation. This location determination capability offers significant advantages. Firstly, it enables the system to seamlessly integrate and provide connectivity to new UEs as they enter the coverage area, without requiring specialized localization infrastructure. Once the approximate location is known, the central cloud server 102 may optimize the network configuration, allocate resources, and establish efficient data paths to serve the new UE optimally. Secondly, it enhances the system's ability to adapt to dynamic changes in the network, as it can quickly detect and localize new UEs, enabling prompt resource allocation and service provisioning.

In accordance with an embodiment, the central cloud server may be further configured to cause the one or more service WAP devices 116 (part of the plurality of network nodes 104) to selectively communicate the first data stream 124A and the second data stream 124B over wireless local area network (WLAN) signals (carrying the first data stream 124A and the second data stream 124B) with a plurality of UEs 118 in a data throughput greater than a threshold throughput, based on an association of a UE of the plurality of UEs 118 to a given network service provider from the plurality of different network service providers. The one or more service WAP devices 116 may employ intelligent traffic management to selectively communicate data streams to user equipment (UEs) based on their association with different network service providers. This selective communication ensures that each UE receives a data throughput exceeding a predefined threshold, in accordance with the service level agreements (SLAs) and quality of service (QoS) requirements of their respective service providers. For example, the service WAP devices 116A may be configured to communicate with the UEs 118a and 118b and the service WAP devices 116A may communicate with the UE 118c based on the network service provider associated with each UE and accordingly prioritize the communication of the first data stream 124A and the second data stream 124B over the wireless local area network (WLAN) signals. The selective communication approach facilitates effective network slicing, allowing the system to dynamically allocate dedicated network resources, such as bandwidth, latency, and throughput, to different service providers based on their specific needs and the number of associated UEs. This dynamic resource allocation optimizes network utilization and ensures that each service provider's traffic is handled according to their unique requirements. Furthermore, in scenarios of network congestion or resource constraints, the system can leverage this selective communication capability to prioritize data streams for UEs associated with certain service providers, ensuring that critical or high-priority traffic is delivered with the required throughput. This prioritization mechanism enhances the overall reliability and responsiveness of the network, particularly in demanding environments. The central cloud server 102 may be further configured to disseminate the appropriate QoS policies, traffic shaping rules, and resource allocation strategies to the one or more service WAP devices 116 based on the service level agreements (SLAs) established with the different network service providers.

In accordance with an embodiment, the central cloud server 102 may be further configured to adjust an uplink-downlink ratio within a Time Division Duplex (TDD) frame structure of each network slice based on real-time traffic demands and quality of service (QoS) requirements of each of the plurality of different network service providers. The central cloud server 102, which monitors and analyzes the traffic patterns and QoS requirements across the network slices serving the various service providers, may dynamically alter the ratio of time allocated for uplink and downlink transmissions within the TDD frame structure of each network slice. For instance, if a particular service provider experiences higher downlink traffic demands, the central cloud server 102 may increase the portion of the TDD frame dedicated to downlink transmissions for that slice, ensuring efficient delivery of data to the user equipment (UEs) associated with that service provider. This dynamic adjustment enables the virtual fiber communication system 100B to optimize resource utilization by tailoring the uplink-downlink ratio to match the real-time traffic patterns and demands of each service provider. This adaptability enhances network efficiency and reduces potential resource wastage, as resources are allocated based on actual traffic requirements rather than static configurations. By receiving and decoding the beacon frames, each hybrid analog-digital repeater device may extract the timestamp value. The extracted timestamp value may serve as a reference for the plurality of hybrid analog-digital repeater devices 114 to calculate the TDD timing parameters. Each of the plurality of hybrid analog-digital repeater devices 114 may utilize timestamp to determine the start and duration of the TDD frames, which may include alternating receive (Rx) and transmit (Tx) phases. By extracting TDD timing parameters from WLAN beacon signals and aligning propagation slots accordingly, the virtual fiber communication system 100A or 100B may achieve zero-buffer mmWave signal relay, minimizing end-to-end latency.

Figure 1C:
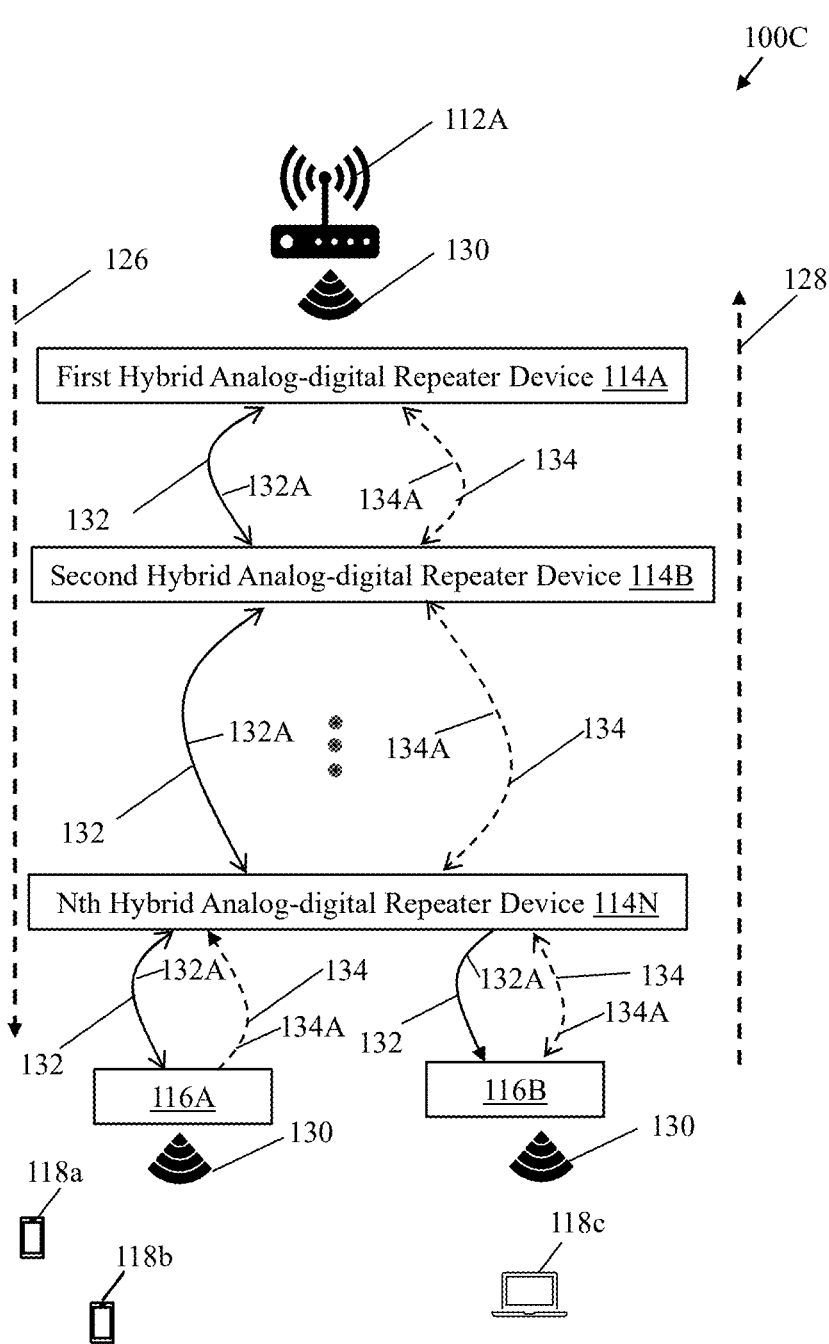
FIG. 1C is a diagram that illustrates an exemplary dual analog data links on a first type of polarization and a second type of polarization across a plurality of hybrid analog-digital repeater devices in a virtual fiber communication system, in accordance with an exemplary embodiment of the disclosure.
Figure 1D:
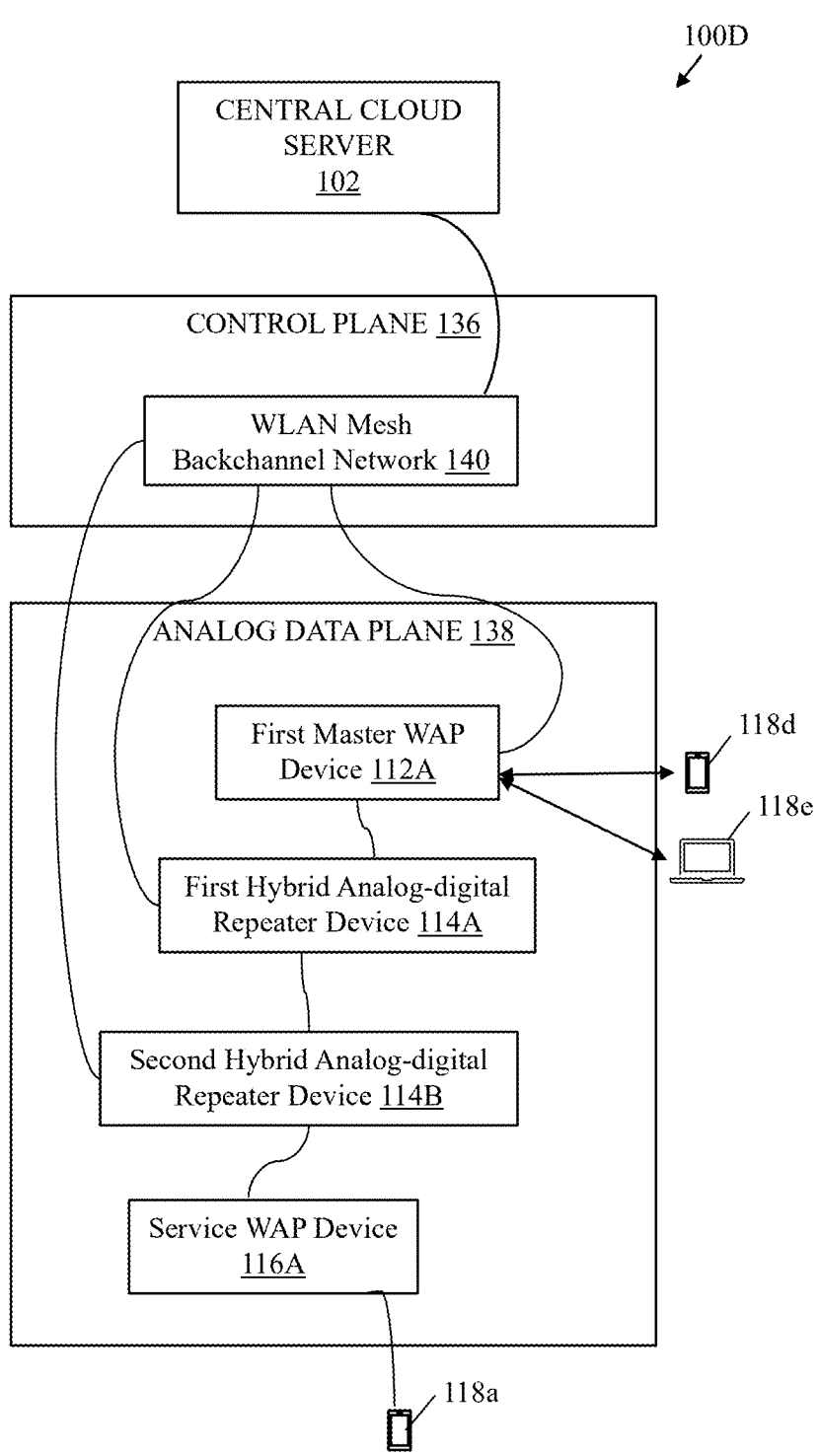
FIG. 1D is a diagram that illustrates an exemplary virtual fiber communication system with a control plane and an analog data plane for spectrum availability-based control of wireless backhaul mesh network, in accordance with an exemplary embodiment of the disclosure.

FIG. 1C is a diagram that illustrates an exemplary dual analog data links on a first type of polarization and a second type of polarization across a plurality of hybrid analog-digital repeater devices in a wireless communication system, in accordance with an exemplary embodiment of the disclosure. FIG. 1C is explained in conjunction with elements from FIGS. 1A and 1B. With reference to FIG. 1C, there is shown a network 100C of the plurality of hybrid analog-digital repeater devices 114.

In accordance with an embodiment, each of the plurality of hybrid analog-digital repeater devices 114 (e.g., the first hybrid analog-digital repeater device 114A, the second hybrid analog-digital repeater device 114B, up to Nth hybrid analog-digital repeater device 114N) may be configured to form dual analog data links 132 and 134 on a first type of polarization 132A and a second type of polarization 134A with one or more neighboring network nodes in the wireless backhaul mesh network 108. When a hybrid analog-digital repeater device is deployed in the wireless backhaul mesh network 108, it establishes two separate analog data links with its neighboring nodes: one link using the first type of polarization (e.g., vertical polarization) and another link using the second type of polarization (e.g., horizontal polarization). The dual analog data links 132 and 134 may operate concurrently and independently. In an implementation, each of the plurality of hybrid analog-digital repeater devices 114 may perform receive (Rx) and transmit (Tx) operations on same type of polarization (e.g., the first type of polarization 132A) at different time slot using time division duplexing (TTD). TDD allows the repeater device to use the same polarization for both Rx and Tx operations by allocating different time slots for each operation. This means that the repeater device can receive data on a specific polarization during one time slot and transmit data on the same polarization during another time slot. Similarly, each of the plurality of hybrid analog-digital repeater devices 114 may perform receive (Rx) and transmit (Tx) operations on second type of polarization 134A at different time slot using TTD, thereby forming full duplex two concurrent bi-directional data paths using two different types of polarizations.

In an example, each of the plurality of hybrid analog-digital repeater devices 114 (e.g. the hybrid analog-digital repeater devices 106A, 106B, . . . , 106N) may transmit a first beam of RF signals carrying user data in an intermediate frequency band (e.g., mmWave frequency) in the first type of polarization 132A over a first analog data link 132 towards its neighboring repeater node, which then amplifies and relays the first beam of RF signals in the intermediate frequency (e.g., mmWave frequency) in the first type of polarization 132A in the downstream communication 126. Similarly, for the upstream communication 128, each of the plurality of hybrid analog-digital repeater devices 114 may be configured to transmit a second beam of RF signals carrying user data in the intermediate frequency band in the first type of polarization 132A over different time slot different towards its neighboring repeater node, which then amplifies and relays further the second beam of RF signal in the intermediate frequency band in the first type of polarization 132A in the upstream communication 128. The first type of polarization 132A may be different from the second type of polarization 134A. An example of the first and the second type of polarization may be a vertical polarization state and a horizontal polarization state. The downstream communication 126 may refer one or more communication paths (e.g., one or more data propagation paths) from the plurality of master WAP devices 112, such as the first master WAP device 112A towards the one or more service WAP devices 116, such as the service WAP device 116A and the service WAP device 116B, via the network 100C of the plurality of hybrid analog-digital repeater devices 114. Further, in the downstream communication 126, the one or more service WAP devices 116 may communicate corresponding user data to its corresponding UEs, such as the UEs 118a and 118b, (connected to the service WAP device 116A) and the UEs 110c (connected to the service WAP device 116B). In this embodiment, the network 100C of the plurality of hybrid analog-digital repeater devices 114 may be a daisy-chain network. The upstream communication 128 may refer to a communication path from the UEs and the one or more service WAP devices 116 towards the plurality of master WAP devices 112, such as the first master WAP device 112A via the network 100C of the plurality of hybrid analog-digital repeater devices 114.

In accordance with an embodiment, the central cloud server 102 may be further configured to cause the plurality of hybrid analog-digital repeater devices 114 in the wireless backhaul mesh network 108 to relay the data traffic on the first type of polarization 132A corresponding to the first analog data link 132 of the dual analog data links 132 and 134 while the second type of polarization 134A may be configured to concurrently spatially scan a corresponding surrounding area to determine a location and a movement pattern of one or more candidate objects as signal blockers without affecting the first analog data link 132. The central cloud server 102 may be configured to relay user data on one polarization while configuring the other polarization for real-time spatial radar scanning by each hybrid analog-digital repeater device. The spare polarization may be used to scan the environment, enabling improved mapping of external objects without affecting the first analog data link 132. The scanning process on the second polarization may operate independently and may not interfere with the data transmission on the first type of polarization 132A. The technique of relaying the data traffic on the first type of polarization 132A using the second type of polarization 134A to determine the location and the movement pattern of one or more candidate objects as signal blockers may be employed in situations where proactive identification and mitigation of signal blockages may be done to maintain high network performance and reliability. By continuously monitoring the surrounding environment for potential blockers, the virtual fiber communication system 100A or 100B may anticipate and adapt to changes in signal propagation conditions. By leveraging the dual analog data links and assigning specific tasks to each polarization, the virtual fiber communication system 100A or 100B may maximize the utilization of available resources and enhance overall network efficiency.

In some embodiments, the central cloud server 102 may be further configured to cause the plurality of hybrid analog-digital repeater devices 114 in the wireless backhaul mesh network to relay the data traffic on the first type of polarization 132A corresponding to the first analog data link 132 of the dual analog data links 132 and 134 while the second type of polarization 134A may also be configured to further relay data traffic carrying different or same data packets without affecting the first analog data link 132. In such a case, each of the plurality of hybrid analog-digital repeater devices 114 may further transmit a third beam of RF signals carrying user data in an intermediate frequency band (e.g., mmWave frequency) in the second type of polarization 134A over a second analog data link 134 towards its neighboring repeater node, which then amplifies and relays the third beam of RF signals in the intermediate frequency (e.g., mm Wave frequency) in the second type of polarization 134A in the downstream communication 126. Similarly, for the upstream communication 128, each of the plurality of hybrid analog-digital repeater devices 114 may be configured to transmit a fourth beam of RF signals carrying user data in the intermediate frequency band in the second type of polarization 134A over different time slot different towards its neighboring repeater node, which then amplifies and relays further the fourth beam of RF signal in the intermediate frequency band in the second type of polarization 134A in the upstream communication 128.

In an alternative implementation, based on an instruction received form the central cloud server 102, each of the plurality of hybrid analog-digital repeater devices 114 may be configured to execute a differential polarized routing of receive and transmit radio frequency (RF) signals in the intermediate frequency (e.g., millimeter wave frequency) in which a downstream communication 126 and an upstream communication 128 may be performed in a different polarization state (e.g., a vertical polarization and a horizontal polarization) in the network 100C of the plurality of hybrid analog-digital repeater devices 114. In this case, the first type of polarization 132A may be dedicated to the downstream communication 126 and the second type of polarization 134A may be dedicated to the upstream communication 128, thereby avoiding the need for the TDD.

In accordance with an embodiment, the central cloud server 102 may be further configured to cause the first master WAP device 112A to communicate either a wireless local area network (WLAN) signal 130 in a first WLAN frequency (e.g., higher frequency of the Wi-Fi® 6, 7 or 8) or beam of RF signals in an intermediate frequency (e.g., mmWave frequency). The one or more service WAP devices 116 may be configured to receive the first beam of RF signals in the intermediate frequency band (e.g., mmWave frequencies or other intermediate frequencies in the range of 10-300 GHz) from the hybrid analog-digital repeater devices (e.g., the Nth hybrid analog-digital repeater devices 114N) and convert back to the WLAN signal 130 to serve plurality of UEs 118 in a data throughput greater than a threshold throughput. The use of plurality of hybrid analog-digital repeater devices 114 along with the different types of polarizations extends the coverage area of the one or more service WAP devices 116, allowing them to serve its corresponding UEs in areas that may have poor signal reception or are located farther away from the first master WAP device 112A, without adding to latency and interference issues due to the one or more analog data propagation paths with dual-polarized signals.

In accordance with an embodiment, the central cloud server 102 may be configured to route data traffic to and from the one or more service WAP devices 116 using two different pairs of dual-polarized signals. Each pair of dual-polarized signals may take a different path through the wireless network, passing through a single chain of the plurality of hybrid analog-digital repeater devices 114 or different chains of hybrid analog-digital repeater devices among the plurality of hybrid analog-digital repeater devices 114. This provides rank-4 connectivity with completely different paths to the one or more service WAP devices 116 (e.g., the service WAP device 116A and the service WAP device 116B), thereby further enhancing resilience against blockages and interference. The rank-4 connectivity indicates multiple independent data streams that can be propagated via the hybrid repeater chains for improved wireless communication performance. For designated wireless links (e.g., certain critical links), the central cloud server 102 may be configured to coordinate between two synchronized service WAP devices, such as the service WAP devices 116A and 116B, to initiate separate streams over different RF chains. The independent streams may then be relayed through completely distinct hybrid repeater chains. This provides path redundancy to counter even simultaneous route disruptions.

In accordance with an embodiment, a donor side of each of the one or more service WAP devices 116 may be modified so that each of the one or more service WAP devices 116 may be configured to communicate with one or more hybrid analog-digital repeater devices over intermediate frequency (e.g., mm Wave frequencies or other intermediate frequencies in the range of 10-300 GHz) using high-gain dual polarized antennas. In an implementation, a service side each of the one or more service WAP devices 116 may include a WLAN antenna and may not include a phase array antenna or any high-gain dual polarized antennas. Alternatively, in another implementation, the service side of each of the one or more service WAP devices 116 may include a WLAN antenna and a phase array antenna. In such a case, the phase array antenna may be configured to communicate a beam of RF signals to its corresponding UEs or communicate the first WLAN signal at the same time depending on the position of its UE to be served. Alternatively, in another implementation, the service side each of the one or more service WAP devices 116 may include a phase array antenna without WLAN antenna. However, a WLAN adaptor (e.g., 2.4 GHZ or 5 Ghz WLAN adaptor)

may be provided in all implementations for low-frequency backchannel connectivity for the control channel.

FIG. 1D is a diagram that illustrates an exemplary virtual fiber communication system with a control plane and an analog data plane for spectrum availability-based control of wireless backhaul mesh network, in accordance with an exemplary embodiment of the disclosure. FIG. 1D is explained in conjunction with elements from FIGS. 1A, 1B, and IC. With reference to FIG. 1D, there is shown a virtual fiber communication system 100D with a control plane 136 and an analog data plane 138.

In accordance with an embodiment, the virtual fiber communication system 100D may employ a software-defined networking (SDN), where the control plane 136 may be separated from the analog data plane 138. In other words, the communication in management mesh for control and remote configuration of each network node is separate and independent from the data network, i.e., analog data plane 138. The data traffic (voice, video, etc.) flows in the data propagation path in analog form through the analog data plane 138, while the control plane 136 (signaling and management) uses a separate digital network, such as the WLAN mesh backchannel network 140 (e.g., may use 2.4 GHz or 5 GHz WLAN frequency). While data traverses the analog network, an out-of-band digital connectivity enables external coordination. The access points, such as the first master WAP device 112A and the service WAP device 116A, may include a high bandwidth Wi-Fi® 7 or Wi-Fi® 8 compatible multi-user (MU) MIMO capability to provide wireless connectivity even in non-line-of sight paths. The one or more UEs, such as the UE 118d, the 118e, and the UE 118a may be Wi-Fi® 7 or Wi-Fi® 8 enabled and may connected to the wireless network using corresponding access points, such as the first master WAP device 112A and the service WAP device 116A. Each of the first master WAP device 112A and the service WAP device 116A may be equipped with multiple antennas to support Multi-User MIMO (MU-MIMO), which allows them to communicate with multiple devices concurrently.

There may be an initial network set up phase, where the central cloud server 102 may be configured to establish a dedicated control channel via the control plane 136 for secure communication between the central cloud server 102 and each of the plurality of hybrid analog-digital repeater devices 114. For example, the central cloud server 102 may be configured to establish a digital backchannel (e.g., the WLAN mesh backchannel network 140) via a wireless local area network (WLAN) frequency (e.g., may use existing 2.4 GHz or 5 GHZ WLAN frequency). Each of the plurality of hybrid analog-digital repeater devices 114 may be assigned a unique identifier (ID) during manufacturing. This allows the central cloud server 102 to identify and communicate with each hybrid analog-digital repeater device individually over the WLAN mesh backchannel network 140 for control and configuration purposes. This initial WLAN mesh backchannel network 140 may be established on lower frequencies (e.g., existing Wi-Fi® frequencies like 2.4/5 GHz may be leveraged) allows the central cloud server 102 to initiate data ingestion of received data from each network node. Each of the plurality of hybrid analog-digital repeater devices 114 may be initialized to be receptive to the central cloud server's instructions. This may involve activating each network node to be connected to a WLAN network. The central cloud server 102 may be configured to broadcast a network name, such as a service set identifier (SSID), of the WLAN mesh backchannel network 140, allowing each network node including the plurality of hybrid analog-digital repeater devices 114 strategically deployed within range to detect and connect to the WLAN mesh backchannel network 140. Each of the plurality of hybrid analog-digital repeater devices 114 may scan and identify the WLAN mesh back-channel network 140 using its SSID and establish a con- nection to it. Once connected, authentication operations and/or mechanisms (e.g., WPA2-PSK) may be employed to verify the identity of the network nodes and ensure secure communication. In an example, encryption protocols (e.g., AES) may then be applied to protect control instructions and configurations transmitted over the backchannel, i.e., the WLAN mesh backchannel network 140. Furthermore, encryption keys may be securely embedded into each of the plurality of hybrid analog-digital repeater devices 114 dur- ing deployment. The encryption keys rotation may be done automatically over-the-air periodically by the central cloud server 102.

In accordance with an embodiment, the plurality of hybrid analog-digital repeater devices 114 may be configured to dynamically adjust their network topology based on instruc- tions from the central cloud server 102. Further, based on the different types telemetry information (described in detail, for example, in FIG. 1A), the central cloud server 102 may be configured to determine how each different types of network node, i.e., the plurality of master WAP devices 112, the plurality of hybrid analog-digital repeater devices 114, and the one or more service WAP devices 116 may connect to each other, forming the wireless backhaul mesh network 108. This provides an enhanced resilience, where even unforeseen failures in one part of the network may be bypassed by using alternative paths. The central cloud server 102 may be further configured to generate configuration updates, such as the wireless backhaul mesh network param- eters 102F, tailored to each node based on its capabilities and context and push these updates to individual nodes using the digital backchannel (i.e., the WLAN mesh backchannel network 140). Each network node may receive its specific configuration update or the wireless backhaul mesh network parameters 102F and apply it within its local area. This enables flexibility and adaptability, as network nodes can adjust their behavior based on local conditions. The local conditions may refer to various factors specific to individual network nodes or their surrounding environment. These factors may influence how the network node operates and how the centralized controller, such as the central cloud server 102 configures each network node. The local condi- tions may include variations in received signal strength, signal-to-noise ratio, and interference levels within each network node's area, a level of activity on different fre- quency bands available to each network node, a number and type of devices connected to the network node, movement of users and variation in data usage (e.g., streaming, down- loads) within the node's coverage area, different applica- tions bandwidth and latency requirements (e.g., gaming, video conferencing may have varying bandwidth and latency demands), or environmental factors, such as physical obstacles, weather, temperature and humidity. Each of the one or more service WAP devices 116, such as the service WAP device 116A, may utilize a separate repeater chain to avoid relying on a single path, just like couriers taking different roads based on the control instruction from the central cloud server 102. This eliminates a single point of failure. Further, multi-source coordinated connectivity pro- vides redundancy against impairments. In other words, by having multiple master WAP devices and service WAP devices send the same user data (data streams), even if one is affected, the others can still deliver the user data to its UE.

In accordance with an embodiment, there may be a test node or a reference node (e.g., UE 118n may be a CPE as a test node), such as a customer premise equipment (CPE) in the virtual fiber communication system 100A, 100B, or 100D. The test node may be used as an independent refer- ence node to ascertain network performance characteristics periodically or continuously, such as a current SNR, SINR, RSSI, TSSI, a throughput rate when served by one of the network node (one of the service access point devices or the master WAP device) in the virtual fiber communication system 100A 100B, or 100D. Such network performance characteristics may be reported to the central cloud server 102. The central cloud server 102 may use the information received independently by the test node for another layer of independent performance monitoring of the wireless back- haul network and presence of interferes and blockers in the virtual fiber communication system 100A, 100B, or 100D along with the different types of telemetry information (e.g., the first type of telemetry information 102D and the second type of telemetry information 102E in an example) received from each network node. In case of detection of any per- formance drop, the central cloud server 102 may be further configured to detect where the fault is (i.e., identify one or more fault nodes) and accordingly re-configure one or more fault nodes to maintain or optimize the network performance (greater than defined threshold performance, for example, greater than 25 Giga byte per second throughput rate and the like).

Training phase of the neural network model 102B: The neural network model 102B may be trained using a first type of telemetry information from the repeater devices and a second type of telemetry information from the WAP devices/ UEs. The first type of telemetry information 102D and the second type of telemetry information 102E have been described in detail, for example, in FIG. 1B. In an example, the first type of telemetry information 102D (vibrations, orientations, sensor readings etc.) and the second type of telemetry information 102E (throughput, RSSI, locations etc.) may be preprocessed and formatted into suitable input vectors. Thereafter, relevant features may be extracted and encoded from the raw telemetry streams. In addition to the different types of telemetry information, data related to the properties of blockers may be collected. This may include information such as the type of blocker (e.g., building, tree, vehicle), its size, shape, and material properties, as well as its location and movement patterns relative to the interfer- ence affected network nodes. The data may be normalized to facilitate training convergence. Using analytical models, simulations or historical data, the neural network model 102B may learn patterns and correlations related to both RF signal interference or blockage and blocker properties. Some potential features could include the type and severity of interference, the location and movement of blockers, the impact of blocker properties on signal propagation, and the performance metrics of the affected links. The training data may be augmented with synthetic examples that simulate various scenarios of RF signal interference or blockage caused by different types of blockers with diverse properties. This can help the neural network learn to recognize and adapt to a wider range of blocker-induced interference and blockage patterns. The augmented training data may be used to update the weights and biases of the neural network model 102B through backpropagation and optimization algorithms. The training process may be monitored using appropriate metrics on the validation set to detect overfitting or under- fitting. The neural network model 102B may learn to predict the impact of blockers on signal interference and blockage based on their properties and the different types of telemetry information. The neural network model 102B may be a deep neural network model with multiple hidden layers employed to effectively model the highly non-linear mapping from the telemetry data to the beam parameters. The model architecture (number of layers, nodes, connections) may be iteratively tuned based on validation performance. The full preprocessed telemetry dataset (i.e., training datasets) may be split into training, validation and test sets while maintaining spatial and temporal coherence in these splits. The neural network model 102B may be then trained using the telemetry input-output pairs in batches using optimization techniques like gradient descent. Known techniques like dropout and regularization may be used to prevent overfitting. The validation set may be then used for tracking generalization performance and tuning hyperparameters. As the wireless backhaul starts operating, new streams of telemetry information 102C may be continued to be collected and updated for training purposes. The neural network model 102B may be periodically retrained and fine-tuned in an online learning fashion on the new telemetry information to continue improving accuracy over time. In some implementations, multiple neural network models with different architectures may be trained in parallel using ensemble methods, where outputs may then be ensembled (e.g. averaged) to improve the overall prediction robustness. For example, in some cases, recurrent neural network (RNN) models or GNN may be trained on the historical telemetry data to capture temporal patterns. These RNNs may forecast short-term network traffic load based on detected daily/weekly cyclic patterns in throughput, RSSI etc. This enables proactively load balancing traffic across the backhaul mesh before congestion occurs. Further, in another example, convolutional neural networks (CNNs) may be trained to detect anomalies in infrared/thermal camera feeds of the repeater devices. These CNNs, GNNs may be combined with RNNs to predict hardware degradations or impending failures based on temporal evolution of the detected anomalies. This allows proactively scheduling maintenance and avoiding failure events that disrupt the backhaul mesh. Furthermore, instead of training from scratch, the neural network model 102B may leverage transfer learning from pre-trained models on similar wireless domains. This accelerates convergence and allows effective training on relatively smaller operational telemetry datasets. The holistic training pipeline may thereby produce an ensemble of specialized neural network models that collectively analyze the multidimensional telemetry data where the trained neural network model 102B may be evaluated on the testing set to assess its ability to accurately detect and respond to RF signal interference or blockage caused by blockers with different properties. Appropriate metrics to measure its performance, such as precision, recall, and FI score, as well as metrics specific to blocker property prediction may be used. The trained neural network model, hereinafter referred to as the neural network model 102B may be deployed in the central cloud server 102 to detect, diagnose, and mitigate RF signal interference or blockage in real-time, taking into account the properties of blockers. Its performance may be monitored and new data on blocker or interferers properties may be collected to retrain and update the neural network model 102B periodically, ensuring its adaptability to changing network conditions, interference patterns, and blocker characteristics.

Figure 2:
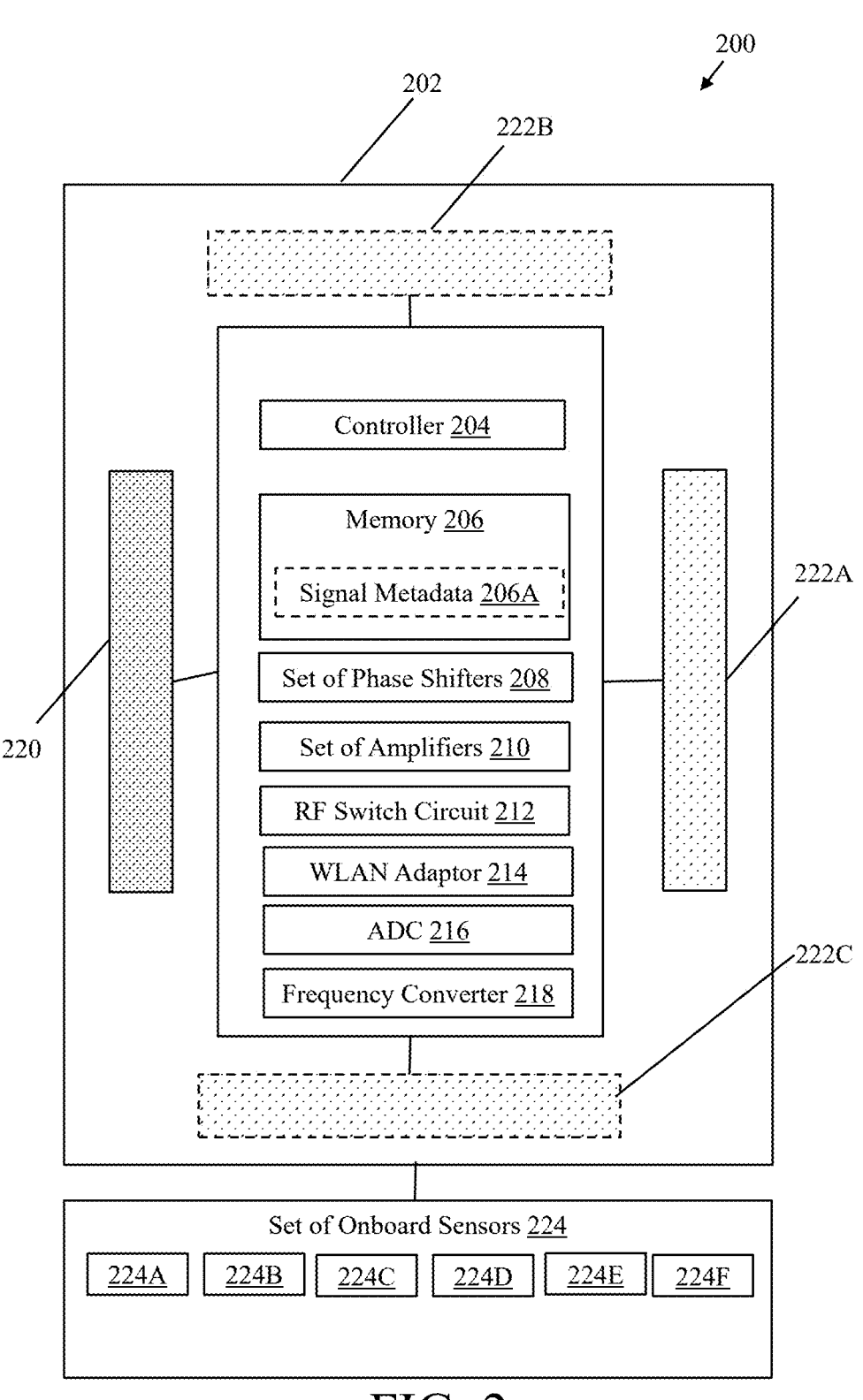
FIG. 2 is a block diagram that illustrates various components of an exemplary hybrid analog-digital repeater device in a virtual fiber communication system, in accordance with an exemplary embodiment of the disclosure.

FIG. 2 is a block diagram that illustrates various components of an exemplary hybrid analog-digital repeater device in a virtual fiber communication system, in accordance with an exemplary embodiment of the disclosure. FIG. 2 is explained in conjunction with elements from FIGS. 1A, 1B, 1C, and 1D. With reference to FIG. 2, there is shown a block diagram 200 of a hybrid analog-digital repeater device 202. The hybrid analog-digital repeater device 202 may correspond to the plurality of hybrid analog-digital repeater devices 114.

The hybrid analog-digital repeater device 202 may include a controller 204, a memory 206, a set of phase shifters 208, a set of amplifiers 210, a radio frequency (RF) switch circuit 212, a wireless local area network (WLAN) adaptor 214, an analog-to-digital converter (ADC) 216, and a frequency converter 218. The hybrid analog-digital repeater device 202 may further include a donor antenna 220 and one or more service phased antenna arrays 222A, 222B, and 222C. Each of the plurality of hybrid analog-digital repeater devices 114 may further include a set of onboard sensors 224.

The controller 204 may be a Field Programmable Gate Array (FPGA), which may be configured to manage digital functions like the first type of telemetry information processing, parameter extraction and control channel interface to the central cloud server 102. The controller 204 may be configured to receive an incoming RF signal relay from an upstream node and relay the incoming RF signal to one or more neighboring nodes. The controller 204 may be configured to extract the signal metadata 206A by digital signal processing of a portion (e.g., a header portion) of the first beam of RF signals without decoding the user data of the first beam of RF signal.

The memory 206 may include suitable logic, circuitry, and/or interfaces that may be configured to store instructions executable by the controller 204. The memory 206 may temporarily store and update the telemetry information (i.e., the first type of telemetry information), which may be periodically communicated to the central cloud server 102. Examples of implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. The memory 206 may store the signal metadata 206A.

The set of phase shifters 208 may be configured to perform precise phase control to digitally steer beams in directed orientations based on control instructions received from the central cloud server 102 or one of the network nodes under control of the central cloud server 102.

The set of amplifiers 210 may be configured to provide signal gain to overcome propagation losses and boost SNR to maintain link budgets over multiple hops of relaying, such as across the plurality of hybrid analog-digital repeater devices 114, all the way to the plurality of UEs 118. The set of amplifiers 210 may be high-gain amplifiers designed to operate in the intermediate frequency bands (e.g., mmWave frequencies in 24-300 GHz or other intermediate frequencies in the range of 10-300 GHZ).

The RF switch circuit 212 may be connected to the set of amplifiers 210. The RF switch circuit 212 may be configured to perform dynamic beam steering by switching between different service phased antenna arrays, such as the one or more service phased antenna arrays 222A, 222B, and 222C to route RF signals along different directions as required. This enables adaptable signal propagation, responding to changing network conditions and optimizing communication paths for improved reliability and performance. This dynamic beam steering capability is particularly beneficial in scenarios where the environment or network conditions may vary, allowing the virtual fiber communication system 100A, 100B or 100D to adapt and maintain efficient signal transmission.

The WLAN adaptor 214 may be configured to handle lower WLAN frequencies (e.g., 2.4 GHz or 5 GHz in Wi-Fi®7 or 8) to establish a backchannel communication link. This may be used for various purposes, including management and coordination between devices in a wireless network. The WLAN adaptor 214 may be configured to provide a backchannel connectivity and control of the network of the plurality of hybrid analog-digital repeater devices 114 via a second WLAN frequency, based on the signal metadata 206A of the first beam of RF signal.

The ADC 216 may be configured to convert a header portion of a RF signal (in intermediate frequency or WLAN frequency) from analog to digital domain. While the data path remains entirely analog for lowest latency, each of the plurality of hybrid analog-digital repeater devices 114, such as the hybrid analog-digital repeater device 202 may extract the signal metadata 206A from RF signals for analysis. This allows deriving wireless metrics like timing parameters, signal quality, interference levels, channel state information, and reference signals using DSP techniques.

The frequency converter 218 may be configured to upconvert or down convert one radio frequency to another radio frequency of an RF signal. For example, the hybrid analog-digital repeater device 202 may utilize the frequency converter 218 to convert a WLAN signal to a beam of RF signals in an intermediate frequency band (e.g., mmWave frequencies or other intermediate frequencies in the range of 10-300 GHz). The frequency converter 218 may perform frequency up conversion by frequency mixing of the WLAN signal with a local oscillator signal, generating an intermediate frequency (e.g., mm Wave frequencies or other intermediate frequencies in the range of 10-300 GHz) for improved wireless communication performance. In some embodiments, the frequency converter 218 may include a phased locked loop (PLL) circuit, which acts as a local oscillator.

The donor antenna 220 may be communicatively coupled to a cascading receiver chain comprising various components (e.g., a set of low noise amplifiers (LNA), a set of receiver front end phase shifters, and a set of power combiners) for the signal reception (not shown for brevity). The donor antenna 220 may be configured to receive an incoming RF signal from an upstream node. The donor antenna 220 may be an WLAN antenna or a phase array antenna, such as a dual-polarized antenna.

The one or more service phased antenna arrays 222A, 222B, and 222C may be configured to relay a beam of RF signals to one or more neighboring downstream nodes. Each of the one or more service phased antenna arrays 222A, 222B, and 222C may be dual-polarized antennas, where separate antenna arrays or same antenna array with partitions (logical partitioning of antenna elements) may be used for horizontal and vertical polarizations allowing polarization diversity mechanisms. Each of the plurality of hybrid analog-digital repeater devices 114 (such as the hybrid analog-digital repeater device 202) may include multiple phased array antennas (e.g., the one or more service phased antenna arrays 222A, 222B, and 222C) with electrically steerable directive beams to focus signals along narrow beams. The phase antenna arrays may include individual phase shifters and amplifiers behind each radiating element to shape and control the beam pattern digitally.

The set of onboard sensors 224 may include one or more image sensors 224A, a lidar sensor 224B, a Radar 224C, a spatial position sensor 224D, an inertial measurement unit (IMU) sensor 224E, and a temperature sensor 224F. A wide range of sensors may be integrated or connected to each analog hybrid analog-digital repeater device of the plurality of hybrid analog-digital repeater devices 114 to enrich each analog hybrid analog-digital repeater device with environmental awareness for intelligent intra-node and inter-node optimizations. The one or more image sensors 224A may be used to visually monitor the surroundings of each network node (i.e., each analog hybrid analog-digital repeater device). Examples of the one or more image sensors 224A may include but are not limited to color image sensors (e.g., high-resolution RGB sensor) and infrared image sensors (e.g., IR cameras). The lidar sensor 224B may be referred to as light detection and ranging sensors used to enable accurate three-dimensional (3D) profiling and depth perception of surroundings of each network node (i.e., each analog hybrid analog-digital repeater device) for precise beam alignment. The Radar 224C may be a built-in radar to detect and track motion to monitor movement patterns of surrounding objects and predict potential RF signal blockers. The spatial position sensor 224D may be a global navigation satellite system (GNSS) sensor, such as global positioning system (GPS) to provide location awareness for each network node used for geospatial analytics and positioning capabilities. The IMU sensor 224E may include a combination of accelerometers, gyroscopes, and magnetometers (sometimes magnetometers may not be used) that typically measures body's specific force, angular rate, and orientation of a given body. In this case, such raw IMU output may be processed to measure node vibrations, shocks, and orientation changes at each network node (i.e., each analog hybrid analog-digital repeater device).

Figure 3:
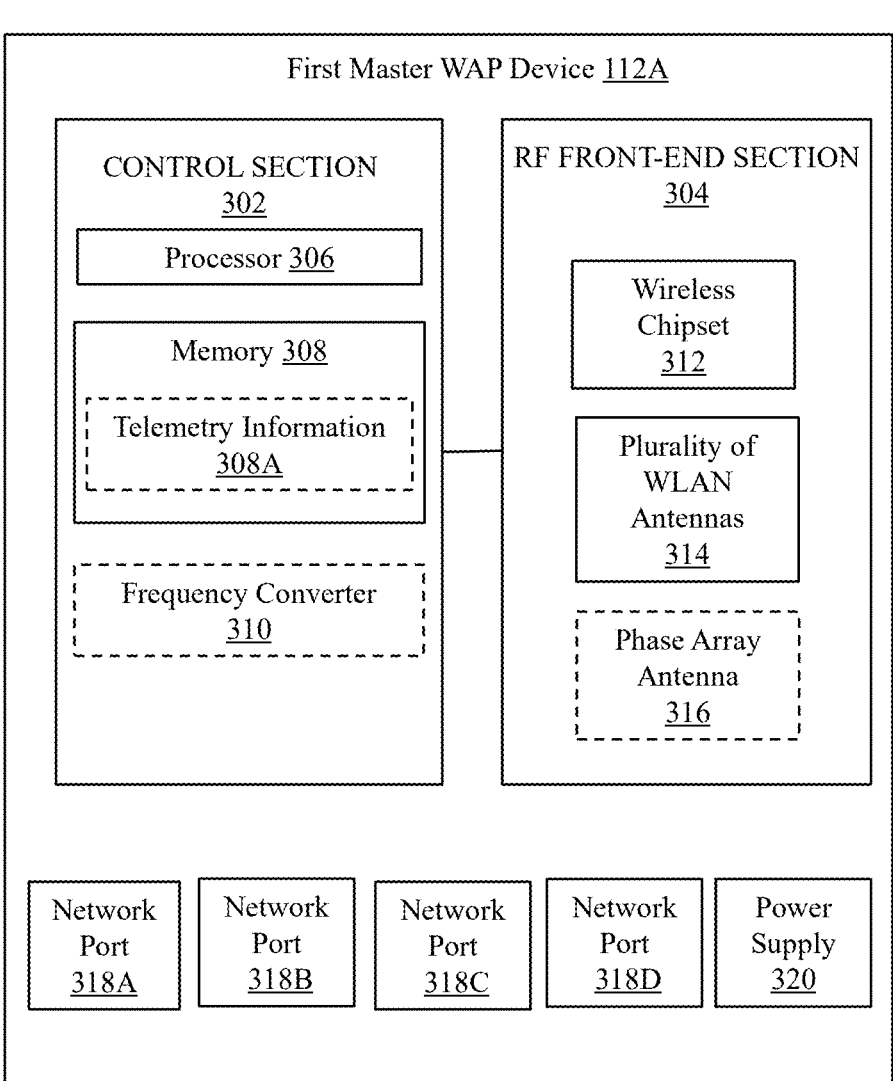
FIG. 3 is a block diagram that illustrates various components of an exemplary master wireless access point (WAP) device in a virtual fiber communication system, in accordance with an exemplary embodiment of the disclosure.

FIG. 3 is a block diagram that illustrates various components of an exemplary master wireless access point (WAP) device in a virtual fiber communication system, in accordance with an exemplary embodiment of the disclosure. FIG. 3 is explained in conjunction with elements from FIGS. 1A, 1B, 1C, 1D, and 2. With reference to FIG. 3, there is shown a block diagram 300 of the first master WAP device 112A. The first master WAP device 112A may correspond to the plurality of master WAP devices 112 (FIG. 1A). The first master WAP device 112A may include a control section 302 and a front-end RF section 304. The control section 302 may include a processor 306 and a memory 308, which may include the telemetry information 308A (i.e., the second type of telemetry information). In an implementation, the control section 302 may include a frequency converter 310. In some implementations, the frequency converter 310 may not be provided. The front-end RF section 304 may include a wireless chipset 312 and a plurality of WLAN antennas 314. In some implementations, the first master WAP device 112A may be modified to further include a high-gain dual polarized antenna, such the phase array antenna 316. The first master WAP device 112A may include a plurality of network ports, such as network ports 318A to 318D, and a power supply 320. The processor 306 may be communicatively coupled to the memory 308, the frequency converter 310 (when provided), and the different components of the front-end RF section 304 and the first master WAP device 112A.

The processor 306 may be configured to communicate a wireless local area network (WLAN) signal in a first WLAN frequency or a beam of Rf signal in an intermediate frequency (e.g. mmWave frequency). The processor 306 may be responsible for overall processing tasks, routing data and managing network operations and receiving instructions from the central cloud server 102. The processor 306 may be a multi-core processor to handle the increased demands of Wi-Fi® 7 or 8, beamforming, and Mu-MIMO.

The memory 308 may include the telemetry information 308A. The telemetry information 308A may be the second type of telemetry information 102E associated with the UEs connected directly to the first master WAP device 112A or via the one or more service WAP devices 116. Additionally, the telemetry information 308A (i.e., the second type of telemetry information 102E) may comprise a unique identifier (ID) of the first master WAP device 112A, its geo-location, an operational state of the first master WAP device 112A and the signal metadata of WLAN signals or mmWave signals communicated by the first master WAP device 112A. The memory 308 may further store temporary data and processing buffers to maintain smooth network performance. Examples of the implementation of the memory 308 may be similar to that of the memory 206 of FIG. 2.

The frequency converter 310 may be present when a functionality of the root node (one of the hybrid analog-digital repeater device) is implemented in the first master WAP device 112A. When present, the frequency converter 310 may be used to up convert or down convert frequencies.

The wireless chipset 312 may be a hardware component responsible for transmitting and receiving WLAN (Wi-Fi®) signals, supporting multiple frequency bands (e.g., 2.4 GHz, 5 GHz, and 6 GHz bands or 6-9 GHz bands), and processing radio signals, such as modulation, demodulation, filtering, and amplification to ensure seamless communication with the one or more Wi-Fi® enabled UEs 118. The wireless chipset 312 may include radio elements that may convert digital data into radio waves for transmission and vice versa.

The plurality of WLAN antennas 314 may be configured to transmit and receive WLAN (Wi-Fi®) signals. The plurality of WLAN antennas 314 may be in MIMO configuration for performing MU-MIMO and beamforming to enhance coverage and signal strength, for the plurality of UEs 118. The number of antennas in the MIMO configuration may vary depending on use case (e.g., consumer grade or enterprise grade), for example 2×2, 4×4 or 8×8 MIMO configurations may be provided.

In some implementations, alternatively, the first master WAP device 112A may be modified to include one or more high-gain antennas, such as the phase array antenna 316 to capture a 5G or 6G mmWave cellular signal from a radio access network (RAN) node (e.g., a gNB or a 5G or 6G small cell) and/or to relay a mmWave signal to one or more hybrid analog-digital repeater devices of the plurality of hybrid analog-digital repeater devices 114.

The network port 318A may be an optical fiber port. The network port 318B may be an Ethernet port. The network port 318C may be a WLAN Fast Ethernet (FE) port. The network port 318D may be a USB port. The power supply 320 may be configured to provide power to the various components of the first master WAP device 112A.

Figure 4:
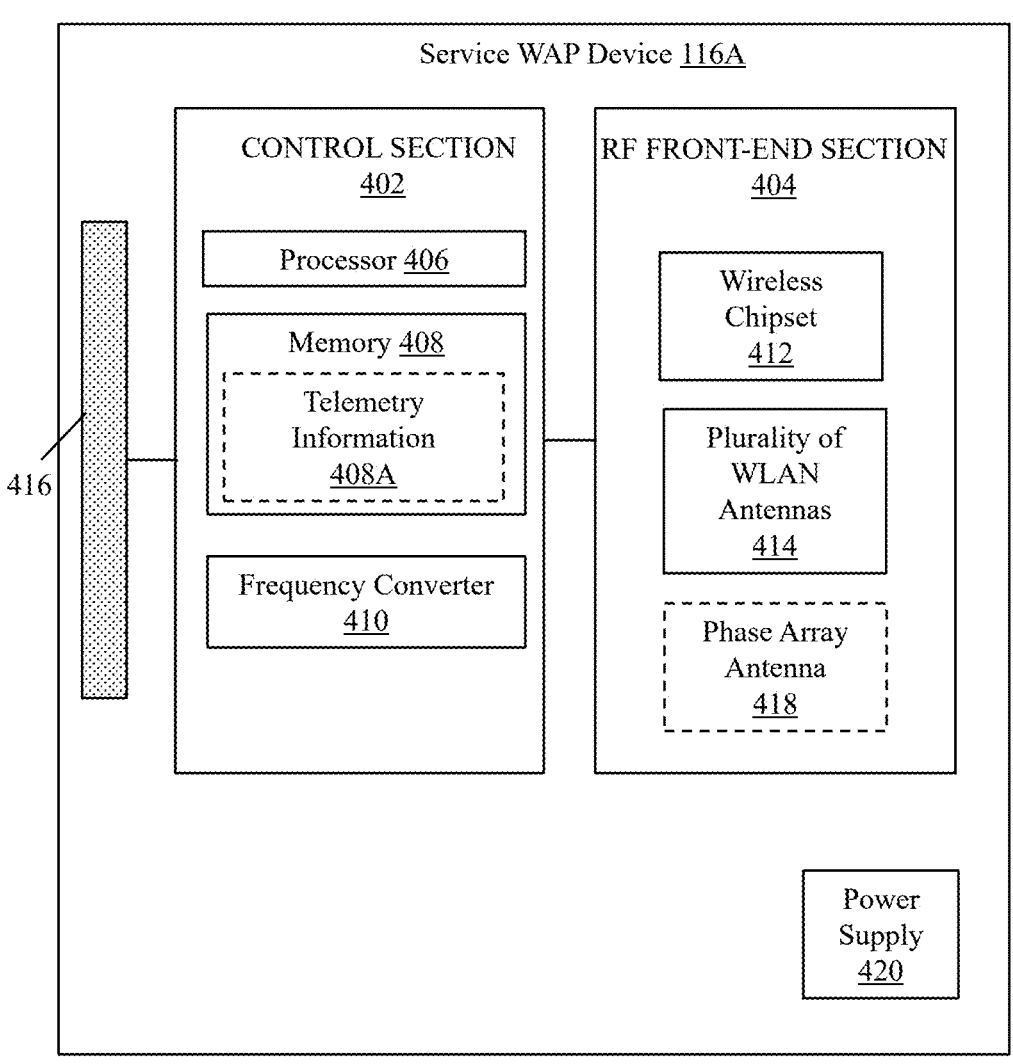
FIG. 4 is a block diagram that illustrates various components of an exemplary service WAP device in a virtual fiber communication system, in accordance with an exemplary embodiment of the disclosure.

FIG. 4 is a block diagram that illustrates various components of an exemplary service WAP device in a virtual fiber communication system, in accordance with an exemplary embodiment of the disclosure. FIG. 4 is explained in conjunction with elements from FIGS. 1A, 1B, 1C, 1D, 2, and 3. With reference to FIG. 4, there is shown a block diagram 400 of the service WAP device 116A. The service WAP device 116A may correspond to the one or more service WAP devices 116 (FIG. 1A). The service WAP device 116A may include a control section 402 and a front-end RF section 404. The control section 402 may include a processor 406 and a memory 408 (with telemetry information 408A), and a frequency converter 410. The front-end RF section 404 may include a wireless chipset 412, a plurality of WLAN antennas 414. In some implementations, the service WAP device 116A may be modified to further include a high-gain dual polarized antenna, such the phase array antenna 416 at a donor side connected to a donor port. In an implementation, the service side may have the plurality of WLAN antennas 414. In another implementation, the service side may include another high-gain antenna, such as a phase array antenna 418 along with the plurality of WLAN antennas 414. In some implementations, the network ports for wired communication may not be provided as it primarily interfaces with wireless WLAN devices. However, in some cases, the network ports like the first master WAP device 112A may be provided. The processor 406 may be communicatively coupled to the memory 408, the frequency converter 410 and the different components of the front-end RF section 404. The service WAP device 116A may further include a power supply 420 to provide power to the various components of the service WAP device 116A.

The processor 406 may be configured to receive a first beam of RF signals in the intermediate frequency band (e.g., mmWave frequencies or other intermediate frequencies in the range of 10-300 GHz) from the hybrid analog-digital repeater devices and convert back to the WLAN signal to serve plurality of UEs 118 in a data throughput greater than a threshold throughput (e.g., 30-100 Gbps).

The memory 408 may include the telemetry information 408A, which may be the second type of telemetry information 408A associated with its connected UEs. Additionally, the telemetry information 408A (i.e., the second type of telemetry information) may comprise a unique identifier (ID) of the service WAP device 116A, its geo-location, an operational state of the service WAP device 116A, and the signal metadata of WLAN signals or mmWave signals received/transmitted by the service WAP device 116A. Examples of the implementation of the memory 408 may be similar to that of the memory 206 of FIG. 2.

The frequency converter 410 may be used to convert the first beam of RF signals in the intermediate frequency band to the first WLAN frequency (e.g., within 6-9 GHZ). In some cases, the intermediate frequency may be converted to another intermediate frequency for wide beam relay. Examples of implementation of the wireless chipset 412, the plurality of WLAN antennas 414, the phase array antennas 416 and 418 may be similar to that of the first master WAP device 112A of FIG. 3.

Figure 5:
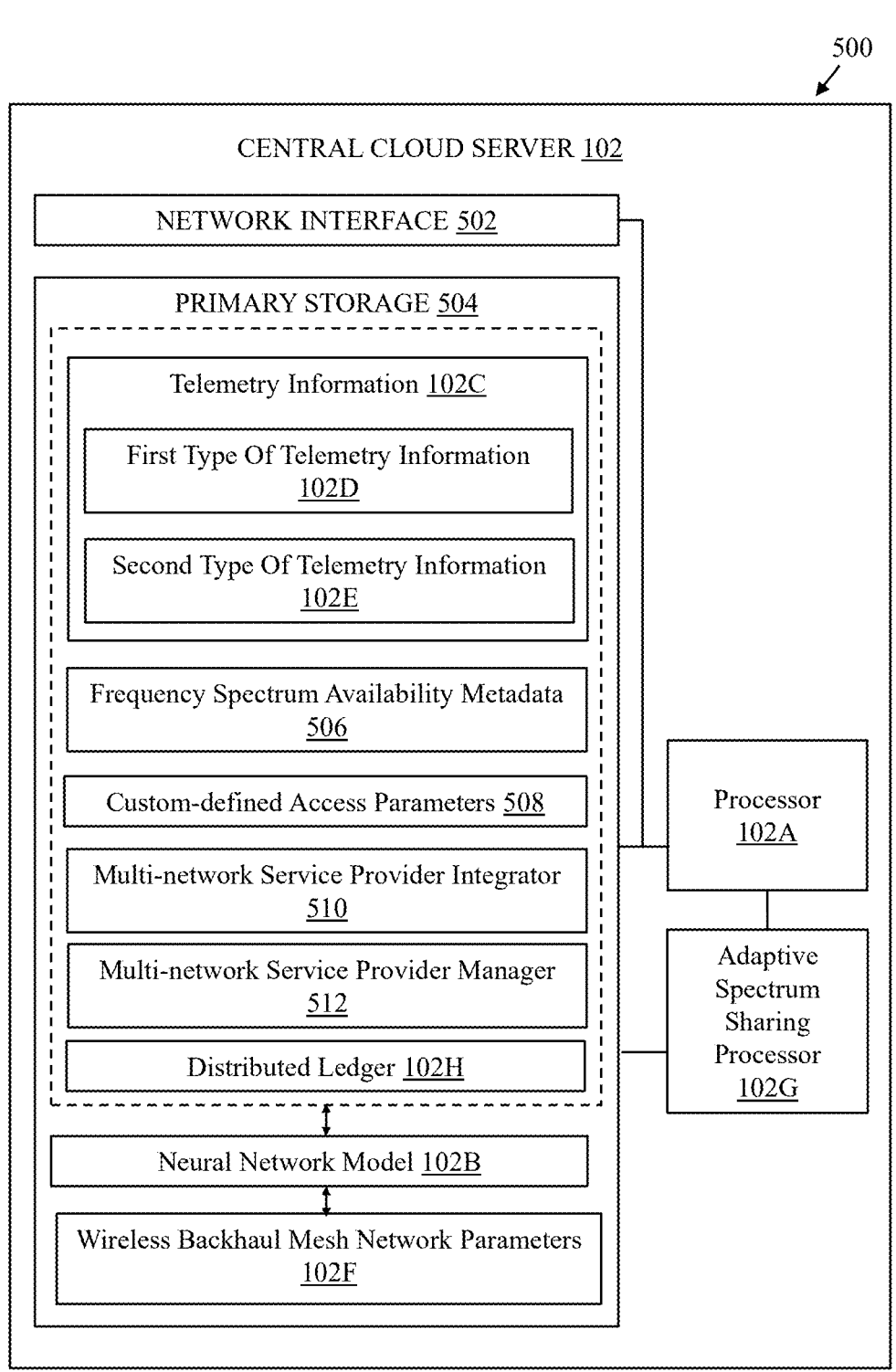
FIG. 5 is a block diagram that illustrates various components of an exemplary central cloud server for spectrum availability-based control of wireless backhaul mesh network for high-performance, ultra-reliable, and ultra-low latency communication, in accordance with an exemplary embodiment of the disclosure.

FIG. 5 is a block diagram that illustrates various components of an exemplary central cloud server for spectrum availability-based control of wireless backhaul mesh network for high-performance, ultra-reliable, and ultra-low latency communication, in accordance with an exemplary embodiment of the disclosure. FIG. 5 is explained in conjunction with elements from FIGS. 1A, 1B, IC, 1D, 2, 3, and 4. With reference to FIG. 5, there is shown a block diagram 500 of the central cloud server 102. The central cloud server 102 may include the processor 102A, the neural network model 102B, the adaptive spectrum sharing processor (ASSP) 102G, a network interface 502 and a primary storage 504. The primary storage 504 may include the telemetry information 102C (which may include the first type of telemetry information 102D and the second type of telemetry information 102E), the wireless backhaul mesh network parameters 102F, the distributed ledger 102H, frequency spectrum availability metadata 506, custom-defined access parameters 508, a multi-network service provider integrator 510, and a multi-network service provider manager 512.

The distributed ledger 102H in the virtual fiber communication system 100A, 100B, or 100D may be a decentralized and tamper-resistant database that is maintained by the central cloud server 102 and the plurality of network nodes 104. The distributed ledger 102H may serve as a secure and transparent record of all configuration updates, routing rules, and transactions within the wireless backhaul mesh network 108. The distributed ledger 102H may leverage the blockchain technology to ensure the integrity and immutability of the stored data, preventing unauthorized modifications and providing a high level of security and trust in the wireless backhaul mesh network 108. When a configuration update or routing rule change is initiated by the central cloud server 102 or an authorized network entity, the update is transmitted as a blockchain transaction to the network of distributed ledger 102H. The transaction may be broadcast to all the nodes maintaining a copy of the distributed ledger 102H, where it undergoes a validation process. Once the transaction is validated and added to the blockchain, the configuration update or routing rule becomes immutable and is propagated to all the network nodes. This process ensures that the updates retain their integrity throughout the propagation process and creates a transparent audit trail of all changes. The distributed ledger 102H may also utilize smart contracts to automate the authentication and authorization processes between network entities, enforcing predefined access controls and permissions. This reduces the risk of unauthorized access and data breaches, enhancing the overall security and reliability of the virtual fiber communication system 100A, 100B, or 100D.

The frequency spectrum availability metadata 506 and the custom-defined access parameters 508 may enable the one or more spectrum owner nodes 110C or the central cloud server 102 to control and manage access to the unused licensed spectrum of the one or more spectrum owner nodes 110C. The frequency spectrum availability metadata 506 may indicate the availability of specific frequency bands for use by the virtual fiber communication system 100A, 100B, or 100D. The frequency spectrum availability metadata 506 may be provided by the one or more spectrum owner nodes 110C, which may be entities that own or have the rights to use specific portions of the radio frequency spectrum. Each of the one or more spectrum owner nodes 110C may be configured to define their access rules and data routing logic using smart contracts, which encode authorization credentials, such as cryptographic keys, for allowing client devices to use the owned frequency bands. The frequency spectrum availability metadata 506 may include information, such as a specific frequency ranges available for use, geographic areas where these frequencies can be used, the times or schedules when the frequencies are available, and any restrictions or limitations on the use of the frequencies. The custom-defined access parameters 508 may define machine-readable rules and conditions set by the one or more spectrum owner nodes 110C that govern how their licensed frequency spectrum can be accessed and used by the virtual fiber communication system 100A, 100B, or 100D and end users. The custom-defined access parameters 508 may include access control policies (specifies which users or devices can access the spectrum), priority levels (specifies which types of traffic or applications have higher priority in using the spectrum), Quality of service (QoS) requirements (specifies the minimum acceptable levels of service quality for different types of traffic), revenue models (specifies the costs and payment methods for accessing the spectrum). The central cloud server 102 may be configured to utilize the frequency spectrum availability metadata 506 and the custom-defined access parameters 508 to configure the plurality of network nodes 104 and manage the allocation of frequency spectrum resources according to the spectrum owners' requirements for enhanced spectrum utilization and spectrum sharing.

The multi-network service provider integrator 510 may be used by the central cloud server 102 to integrate new network service providers into the virtual fiber communication system 100A, 100B, or 100D. The multi-network service provider integrator 510 may provide standardized process and interfaces for new service providers to join the virtual fiber communication system 100A, 100B, or 100D, including authentication, authorization, and establishing secure communication channels. The central cloud server 102 may be further configured to provide a user interface (UI) to assist in the configuration of network slices, resource allocation policies, and quality of service (QoS) parameters according to the specific requirements and service level agreements (SLAs) of the new service provider. The central cloud server 102 may be further configured to validate interoperability between the new service provider's infrastructure (e.g., base stations, core networks) and the virtual fiber communication system 100A, 100B, or 100D facilitating the necessary protocol translations, data format conversions, and signaling interactions using the multi-network service provider integrator 510. The central cloud server 102 may be further configured to generate a controlled environment for testing and validating the integration of the new service provider's systems with the virtual fiber communication system 100A, 100B, or 100D infrastructure, ensuring seamless operation before going into actual operation. For example, the multi-network service provider integrator 510 may enable a new mobile network operator (MNO) to integrate their 5G core network with the virtual fiber communication system 100A, 100B, or 100D (e.g. Peltbeam's system), allowing the MNO to leverage the wireless backhaul and access infrastructure for enhanced coverage and capacity. In another example, the multi-network service provider integrator 510 may enable integration of a new fixed wireless access (FWA) service provider, enabling the FWA service provider to offer high-speed internet services to residential and enterprise customers using the network of the virtual fiber communication system 100A, 100B, or 100D. Furthermore, the multi-network service provider integrator 510 may enable onboarding of a private network operator, or the one or more spectrum owner nodes 110C and configure dedicated network slices to support their specific use cases and security requirements.

The multi-network service provider manager 512 may be used to manage and enforce the rules, policies, and resource allocations for the different network service providers operating within the virtual fiber communication system 100A, 100B, or 100D by the central cloud server 102. The multi-network service provider manager 512 may be responsible for defining and enforcing policies related to resource allocation, quality of service (QoS), security, and access control for each network service provider based on their respective SLAs and requirements. The multi-network service provider manager 512 may be further responsible for dynamically allocating and managing network resources, such as bandwidth, compute resources, and network slices, across the different service providers to ensure fair and efficient resource utilization. The central cloud server 102 may be further configured to monitor the performance and compliance of each service provider's network slice, ensuring that the agreed-upon SLAs are met and taking corrective actions, if necessary, in coordination with the multi-network service provider manager 512. The central cloud server 102 may be further configured to generating reports and provide analytical insights into the usage patterns, resource consumption, and performance metrics of each service provider, enabling informed decision-making and optimization using the multi-network service provider manager 512. Examples of the multi-network service provider manager 512 in action could include: a) enforcing different quality of service (QoS) policies for different service providers based on their respective SLAs, such as prioritizing latency-sensitive traffic for one provider while ensuring minimum throughput guarantees for another; b) dynamically adjusting the uplink-downlink ratio within the Time Division Duplex (TDD) frame structure of each network slice based on real-time traffic demands and QoS requirements; c) implementing network slicing and traffic isolation mechanisms to ensure secure and isolated operations for different service providers sharing the same physical infrastructure. By using the multi-network service provider integrator 510 and the multi-network service provider manager 512, the central cloud server 102 may effectively support a high-performance multi-tenant environment, enabling multiple network service providers to leverage the shared infrastructure while maintaining secure, isolated, and optimized operations according to their specific requirements and service level agreements.

FIGS. 6A, 6B, 6C, and 6D collectively, is a flowchart of a method for spectrum availability-based control of wireless backhaul mesh network for high-performance, ultra-reliable, and ultra-low latency communication, in accordance with an embodiment of the disclosure. FIGS. 6A to 6D are explained in conjunction with elements from FIGS. 1A, 1B, 1C, 1D, 2, 3, 4, and 5. With reference to 6A, 6B, 6C, and 6D, there is shown a flowchart of a method 600 comprising exemplary operations 602 through 638. The method 600 may be implemented in the virtual fiber communication system 100A, 100B or 100D.

At 602, telemetry information 102C may be obtained from the plurality of network nodes 104 of the wireless backhaul mesh network 108.

At 604, dual radio access networks may be established in an analog data plane 138 among the plurality of network nodes 104 in the wireless backhaul mesh network 108 in which a first radio access network of the dual radio access networks may be established using a first frequency spectrum and a second radio access network may be established using a second frequency spectrum lower than the first frequency spectrum.

At 606, the first radio access network (e.g. mmWave) and the second radio access network (e.g., WLAN or ISM) in the analog data plane 138 may be controlled via a common control plane, such as the control plane 136, which is distinct from the analog data plane 138.

At 608, each hybrid analog-digital repeater device of the plurality of hybrid analog-digital repeater devices 114 may be caused to form dual analog data links 132 and 134 on the first type of polarization 132A and the second type of polarization 134A with one or more neighboring hybrid analog-digital repeater devices in the wireless backhaul mesh network 108. The dual analog data links 132 and 134 may correspond to two concurrent point-to-point wireless backhaul links among the plurality of hybrid analog-digital repeater devices 114. The plurality of hybrid analog-digital repeater devices 114 may be a part of the plurality of network nodes 104.

At 610, the first master WAP device 112A of the plurality of master WAP devices 112 may be caused to receive a first data stream 124A associated with a first network service provider over the first virtual local area network (VLAN) 120A from the aggregation switch 110B and a second master WAP device 112B of the plurality of master WAP device 112 to receive a second data stream 124B associated with a second network service provider over the second VLAN 120B from the aggregation switch 110B coupled to a core fiber backhaul link, such as the fiber backbone 110A, to control traffic flow and routing among the core fiber backhaul link and the plurality of master WAP devices 112 in the isolated network slice. The plurality of network nodes 104 may comprise the plurality of master WAP devices 112. Each master WAP device may be associated with an isolated network slice of one of a plurality of different network service providers.

At 612, the first hybrid analog-digital repeater device 114A of the plurality of hybrid analog-digital repeater devices may be caused to receive the first data stream 124A in a first intermediate frequency from the first master WAP device 112A and the second data stream 124B in a second intermediate frequency from the second master WAP device 112B. The plurality of hybrid analog-digital repeater devices 114 may be the part of the plurality of network nodes 104.

At 614, the first hybrid analog-digital repeater device 114A of the plurality of hybrid analog-digital repeater devices 114 may be caused to relay the first data stream 124A and the second data stream 124B over the plurality of hybrid analog-digital repeater devices 114 via the point-to-point wireless backhaul links to reach to one or more service WAP devices 116.

At 616, one or more service WAP devices 116 of the plurality of network nodes 104 may be caused to selectively communicate the first data stream 124A and the second data stream 124B over wireless local area network (WLAN) signals with the plurality of UEs 118 in a data throughput greater than a threshold throughput, based on an association of a UE of the plurality of UEs 118 to a given network service provider of the plurality of different network service providers.

At 618, each of the plurality of hybrid analog-digital repeater devices 114 may be caused to extract time division duplex (TDD) timing parameters from wireless local area network (WLAN) beacon signals to align propagation slots of the each of the plurality of hybrid analog-digital repeater devices 114 to receive mmWave signals from an upstream neighboring node in a receive phase (Rx) and transmit to a downstream neighboring node in a transmit phase (Tx).

At 620, each of the plurality of hybrid analog-digital repeater devices 114 may be caused to synchronize to phases of wireless local area network (WLAN) time division duplexing (TDD) slots at each hop of the plurality of hybrid analog-digital repeater devices 114 for zero-buffer mmWave signals relay across the plurality of network nodes 104 without baseband processing, based on the extracted TDD timing parameters.

At 622, the frequency spectrum availability metadata 506 and custom-defined access parameters 508 may be obtained from one or more spectrum owner nodes 110C.

At 624, spectrum availability variations may be detected across the plurality of network nodes 104 based on the obtained telemetry information 102C, the frequency spectrum availability metadata 506, and the custom-defined access parameters 508.

At 626, a capacity increase request may be obtained from a plurality of UEs, such as the UEs 118A or 118B, to increase capacity for a specific time-period.

At 628, based on the detected spectrum availability variations across the plurality of network nodes 104, the plurality of network nodes 104 may be controlled to inject additional capacity to one or more data sessions in the wireless backhaul mesh network 108 in a real-time or near real time when an increase in data traffic demand is detected in one or more data propagation paths across the plurality of network nodes 104 in the wireless backhaul mesh network 108.

At 630, a plurality of flow parameters of data streams associated with a plurality of UEs 118 served by the wireless backhaul mesh network 108 may be monitored based on the obtained telemetry information 102C and the detected spectrum availability variations across the plurality of network nodes 104. The plurality of flow parameters may comprise two or more of: a bandwidth demand, a latency sensitivity, and a jitter tolerance.

At 632, a set of alternative analog data propagation paths may be determined either over the first radio access network corresponding to a mm Wave mesh network or over the second radio access network corresponding to a wireless local area network (WLAN) network to serve the plurality of UEs 118, based on the monitored plurality of flow parameters of data streams associated with the plurality of UEs 118.

At 634, data packets may be prioritized over the plurality of network nodes 104 based on a type-of-service requested by a UE of the plurality of UEs 118 served by the wireless backhaul mesh network 108, and the custom-defined access parameters from one or more spectrum owner nodes 110C.

At 636, each of the plurality of network nodes 104 may be caused to detect a local interference and congestion event based on the obtained telemetry information 102C.

At 638, each of the plurality of network nodes 104 may be caused to calibrate radio frequency (RF) parameters including a transmit power, a transmit frequency, or a beam orientation based on the detected local interference and congestion event.

Various embodiments of the disclosure may provide the virtual fiber communication system 100A, 100B or 100D (FIG. 1A, 1B, or 1D). The virtual fiber communication system 100A, 100B or 100D may include a central cloud server configured to obtain telemetry information 102C from the plurality of network nodes 104 of the wireless backhaul mesh network 108. The central cloud server 102 may be further configured to obtain frequency spectrum availability metadata and custom-defined access parameters from one or more spectrum owner nodes 110C. The central cloud server 102 may be further configured to detect spectrum availability variations across the plurality of network nodes 104 based on the obtained telemetry information 102C, the frequency spectrum availability metadata, and the custom-defined access parameters. Based on the detected spectrum availability variations across the plurality of network nodes 104, the central cloud server 102 may be further configured to control the plurality of network nodes 104 to inject additional capacity to one or more data sessions in the wireless backhaul mesh network 108 in a real-time or near real time when an increase in data traffic demand is detected in one or more data propagation paths across the plurality of network nodes 104 in the wireless backhaul mesh network 108.

Various embodiments of the disclosure may provide a computer program product for wireless communication, the computer program product comprising a computer-readable storage medium (e.g., a non-transitory computer-readable storage medium) having program instructions embodied therewith, the program instructions are executable by a system to cause the system to execute operations, the operations comprising obtaining telemetry information 102C from the plurality of network nodes 104 of the wireless backhaul mesh network 108. The operations may further comprise obtaining frequency spectrum availability metadata and custom-defined access parameters from one or more spectrum owner nodes 110C. The operations may further comprise detect spectrum availability variations across the plurality of network nodes 104 based on the obtained telemetry information 102C, the frequency spectrum availability metadata, and the custom-defined access parameters. Based on the detected spectrum availability variations across the plurality of network nodes 104, the operations may further comprise controlling the plurality of network nodes 104 to inject additional capacity to one or more data sessions in the wireless backhaul mesh network 108 in a real-time or near real time when an increase in data traffic demand is detected in one or more data propagation paths across the plurality of network nodes 104 in the wireless backhaul mesh network 108.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A virtual fiber communication system, comprising:
a central cloud server configured to:
obtain telemetry information from a plurality of network nodes of a wireless backhaul mesh network, wherein the telemetry information comprises:
a first type of telemetry information from a plurality of hybrid analog-digital repeater devices, and
a second type of telemetry information from a plurality of wireless access point devices;
collect data related to properties of signal blockers in a surrounding area of the plurality of network nodes;
train a neural network model based on the first type of telemetry information and the second type of telemetry information; and deploy the trained neural network model to detect a Radio Frequency (RF) signal interference or a blockage caused by the signal blockers,
wherein the detection is based on the data related to the properties of the signal blockers.

2. The virtual fiber communication system according to claim 1, wherein the central cloud server is further configured to preprocess the first type of telemetry information and the second type of telemetry information into input vectors, and
wherein the neural network model is trained based on the input vectors.

3. The virtual fiber communication system according to claim 1, wherein the data related to the properties of the signal blockers comprises a blocker type, a blocker size, a blocker shape, material properties of the signal blockers, locations of the signal blockers, and movement patterns of the signal blockers relative to the plurality of network nodes.

4. The virtual fiber communication system according to claim 1, wherein the central cloud server is further configured to augment training data with synthetic examples that simulate various scenarios of the RF signal interference or the blockage, and
wherein the neural network model is trained further based on the augmented training data that includes the telemetry information and the synthetic examples.

5. The virtual fiber communication system according to claim 1, wherein the neural network model is a deep neural network model with multiple hidden layers to model a non-linear mapping from the telemetry information to beam parameters.

6. The virtual fiber communication system according to claim 1, wherein the neural network model comprises a recurrent neural network (RNN) model.

7. The virtual fiber communication system according to claim 1, wherein the neural network model comprises a convolutional neural network (CNN) to detect anomalies in camera feeds of the plurality of hybrid analog-digital repeater devices in the wireless backhaul mesh network.

8. The virtual fiber communication system according to claim 7, wherein the central cloud server is further configured to combine the CNN with a recurrent neural network (RNN) to predict hardware degradations or impending failures in the wireless backhaul mesh network, and
wherein the prediction is based on a temporal evolution of the detected anomalies.

9. The virtual fiber communication system according to claim 1, wherein the first type of telemetry information is related to a performance of the plurality of hybrid analog-digital repeater devices, and
the second type of telemetry information is related to performance metrics and characteristics of end-user devices connected to the plurality of wireless access point devices.

10. The virtual fiber communication system according to claim 1, wherein the central cloud server is further configured to periodically retrain the neural network model in an online learning fashion based on new streams of the telemetry information.

11. The virtual fiber communication system according to claim 1, wherein the central cloud server is further configured to:
monitor a performance of the trained neural network model;
collect new data on the properties of the signal blockers; and retrain the neural network model periodically based on the collected new data.

12. A method, comprising:

in a virtual fiber communication system that comprises a central cloud server:

obtaining, by the central cloud server, telemetry information from a plurality of network nodes of a wireless backhaul mesh network, wherein the telemetry information comprises:

a first type of telemetry information from a plurality of hybrid analog-digital repeater devices, and a second type of telemetry information from a plurality of wireless access point devices;

collecting, by the central cloud server, data related to properties of signal blockers in a surrounding area of the plurality of network nodes;

training, by the central cloud server, a neural network model based on the first type of telemetry information and the second type of telemetry information; and deploying, by the central cloud server, the trained neural network model to detect a Radio Frequency (RF) signal interference or a blockage caused by the signal blockers, wherein the detection is based on the data related to the properties of the signal blockers.

13. The method according to claim 12, further comprising preprocessing, by the central cloud server, the first type of telemetry information and the second type of telemetry information into input vectors, wherein the neural network model is trained based on the input vectors.

14. The method according to claim 12, wherein the data related to the properties of the signal blockers comprises a blocker type, a blocker size, a blocker shape, material properties of the signal blockers, locations of the signal blockers, and movement patterns of the signal blockers relative to the plurality of network nodes.

15. The method according to claim 12, further comprising augmenting, by the central cloud server, training data with synthetic examples that simulate various scenarios of the RF signal interference or the blockage, wherein the neural network model is trained further based on the augmented training data that includes the telemetry information and the synthetic examples.

16. The method according to claim 12, wherein the neural network model comprises a convolutional neural network (CNN) to detect anomalies in camera feeds of the plurality of hybrid analog-digital repeater devices in the wireless backhaul mesh network.

17. The method according to claim 16, further comprising combining, by the central cloud server, the CNN with a recurrent neural network (RNN) to predict hardware degradations or impending failures in the wireless backhaul mesh network, wherein the prediction is based on a temporal evolution of the detected anomalies.

18. The method according to claim 12, wherein the first type of telemetry information is related to a performance of the plurality of hybrid analog-digital repeater devices, and the second type of telemetry information is related to performance metrics and characteristics of end-user devices connected to the plurality of wireless access point devices.

19. The method according to claim 12, further comprising periodically retraining, by the central cloud server, the neural network model in an online learning fashion based on new streams of the telemetry information.

20. The method according to claim 12, further comprising:

monitoring, by the central cloud server, a performance of the trained neural network model;

collecting, by the central cloud server, new data on the properties of the signal blockers; and retraining, by the central cloud server, the neural network model periodically based on the collected new data.

* * * * *